(12) United States Patent
Tanaka et al.

(10) Patent No.: US 6,990,117 B1
(45) Date of Patent: Jan. 24, 2006

(54) CSMA WIRELESS LAN HAVING ANTENNA DEVICE AND TERMINAL STATION

(75) Inventors: Makoto Tanaka, Kariya (JP); Kazuoki Matsugatani, Kariya (JP)

(73) Assignee: DENSO Corporation, Kariya (JP)

( * ) Notice: Subject to any disclaimer, the term of this patent is extended or adjusted under 35 U.S.C. 154(b) by 757 days.

(21) Appl. No.: 09/710,219

(22) Filed: Nov. 10, 2000

(30) Foreign Application Priority Data

Nov. 24, 1999 (JP) ................................. 11-333116

(51) Int. Cl.
*H04L 12/413* (2006.01)

(52) U.S. Cl. ..................................................... 370/447

(58) Field of Classification Search ................ 370/338, 370/339, 332, 333, 445, 448, 442, 453, 462, 370/310, 328, 320, 335, 330, 334, 342
See application file for complete search history.

(56) References Cited

U.S. PATENT DOCUMENTS

| | | | | |
|---|---|---|---|---|
| 5,131,006 A | * | 7/1992 | Kamerman et al. | 375/130 |
| 5,231,634 A | * | 7/1993 | Giles et al. | 370/348 |
| 5,369,639 A | * | 11/1994 | Kamerman et al. | 370/347 |
| 5,721,725 A | * | 2/1998 | Want et al. | 370/236 |
| 5,828,663 A | * | 10/1998 | Ikegami | 370/347 |
| 5,852,405 A | * | 12/1998 | Yoneda et al. | 340/825.02 |
| 5,909,462 A | * | 6/1999 | Kamerman et al. | 375/147 |
| 5,936,577 A | * | 8/1999 | Shoki et al. | 342/373 |
| 5,987,033 A | * | 11/1999 | Boer et al. | 370/445 |
| 6,067,291 A | * | 5/2000 | Kamerman et al. | 370/338 |
| 6,151,310 A | * | 11/2000 | Dent | 370/330 |
| 6,625,162 B2 | * | 9/2003 | Myojo et al. | 370/445 |
| 6,788,661 B1 | * | 9/2004 | Ylitalo et al. | 370/334 |
| 6,788,937 B1 | * | 9/2004 | Willenegger et al. | 455/434 |
| 2005/0135322 A1 | * | 6/2005 | Lim et al. | 370/342 |

FOREIGN PATENT DOCUMENTS

JP 09247187 9/1997

* cited by examiner

*Primary Examiner*—Hassan Kizou
*Assistant Examiner*—Ricardo Pizarro
(74) *Attorney, Agent, or Firm*—Harness, Dickey & Pierce, PLC

(57) ABSTRACT

In a CSMA wireless LAN, a sector antenna power detectors detects the power received by antenna elements of a sector antenna. A reference power generator generates a reference power, and a comparator compares the detected power with the reference power. A controller unit, based on the comparison result, determines whether there is a hidden terminal station. If a hidden terminal station is determined to exist, the controller outputs control signals so as to direct the terminal station to increase the transmission power. The terminal station in turn will increase the transmission power in response to the control signals to widen the communication area.

19 Claims, 15 Drawing Sheets

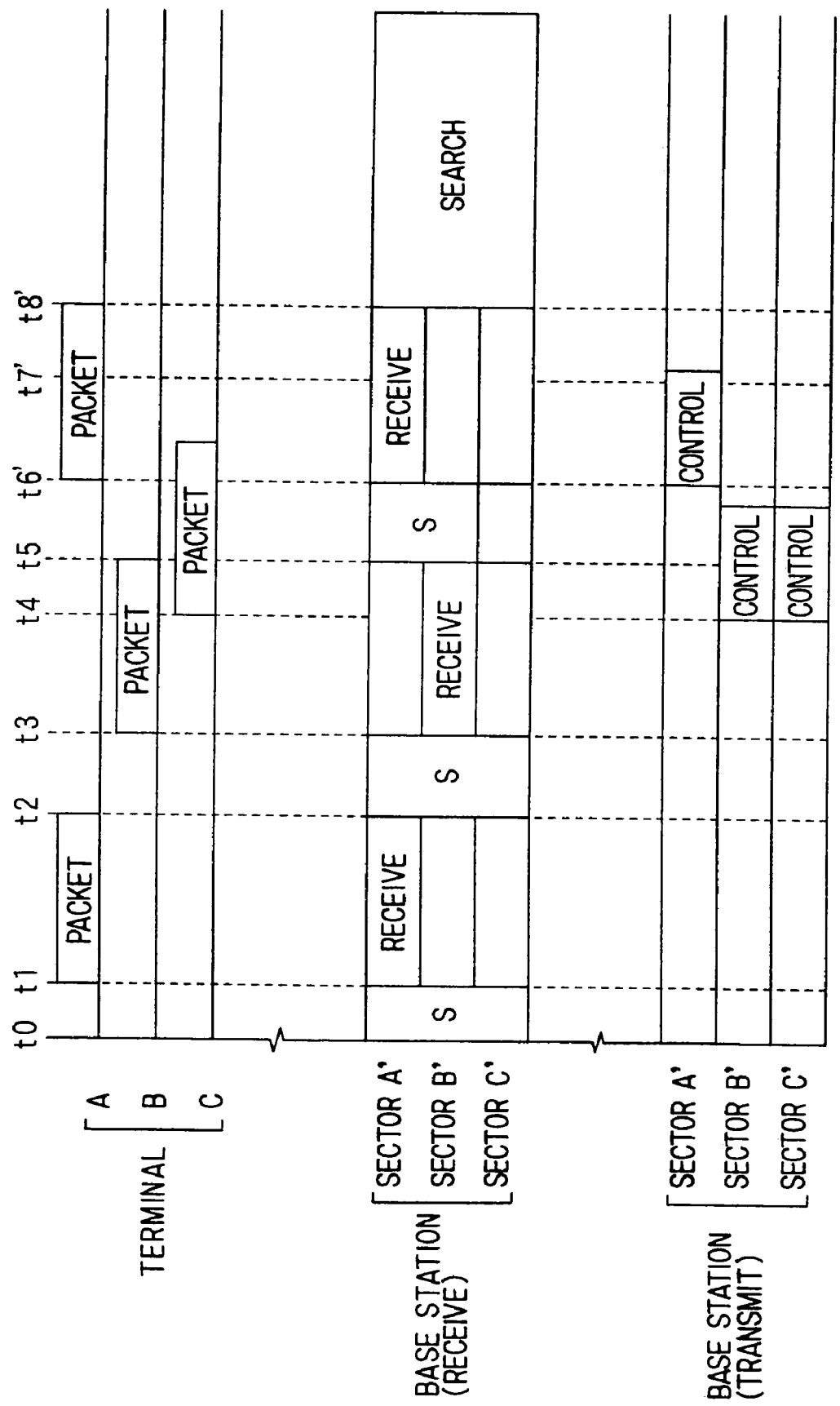

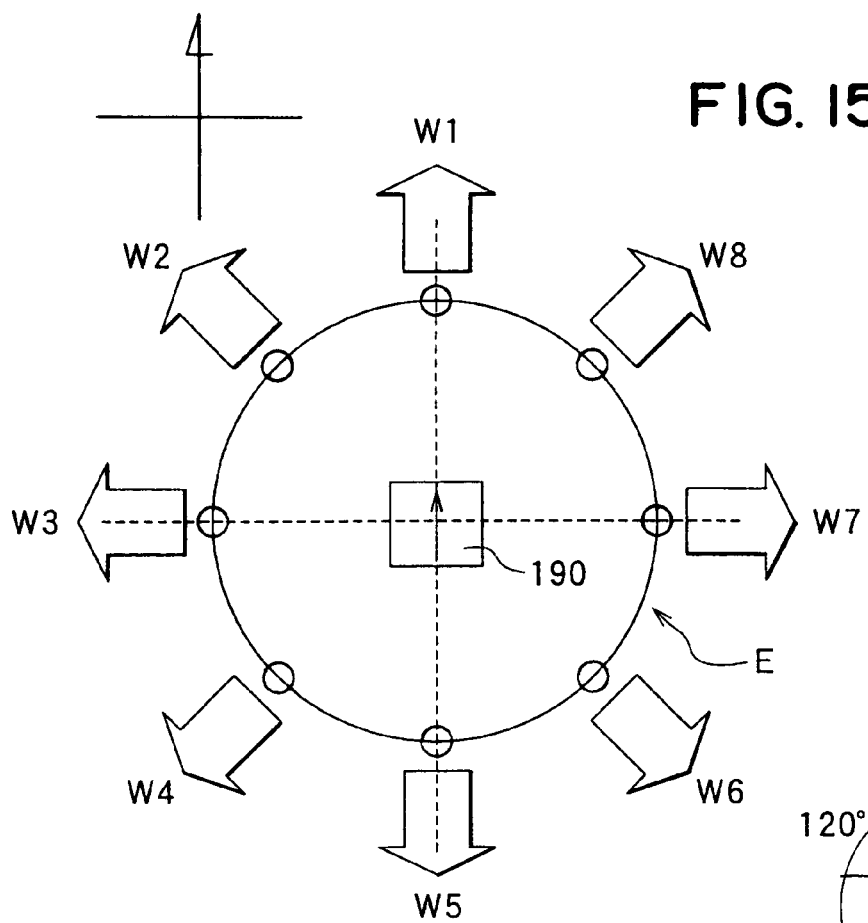
FIG. 15
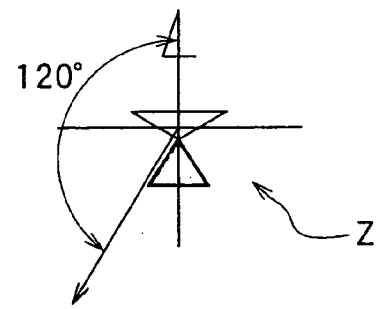
FIG. 16
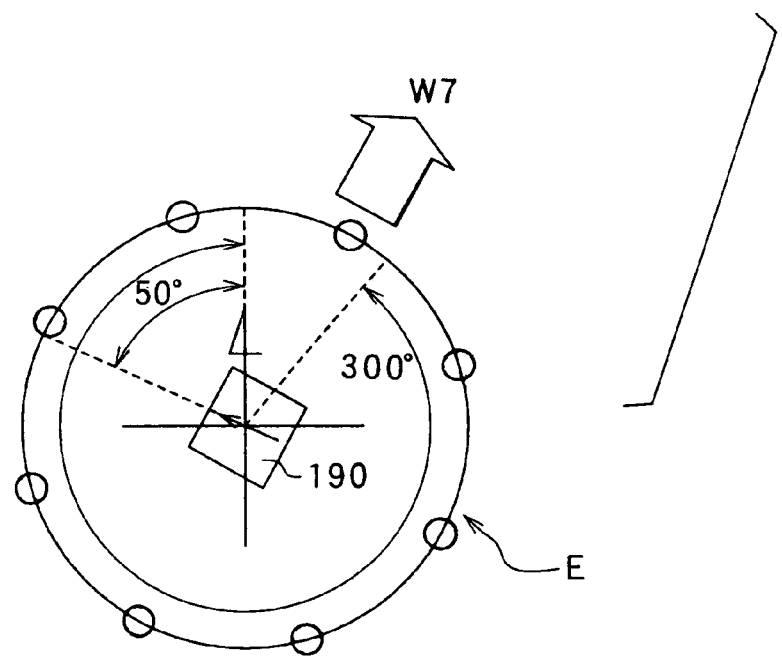

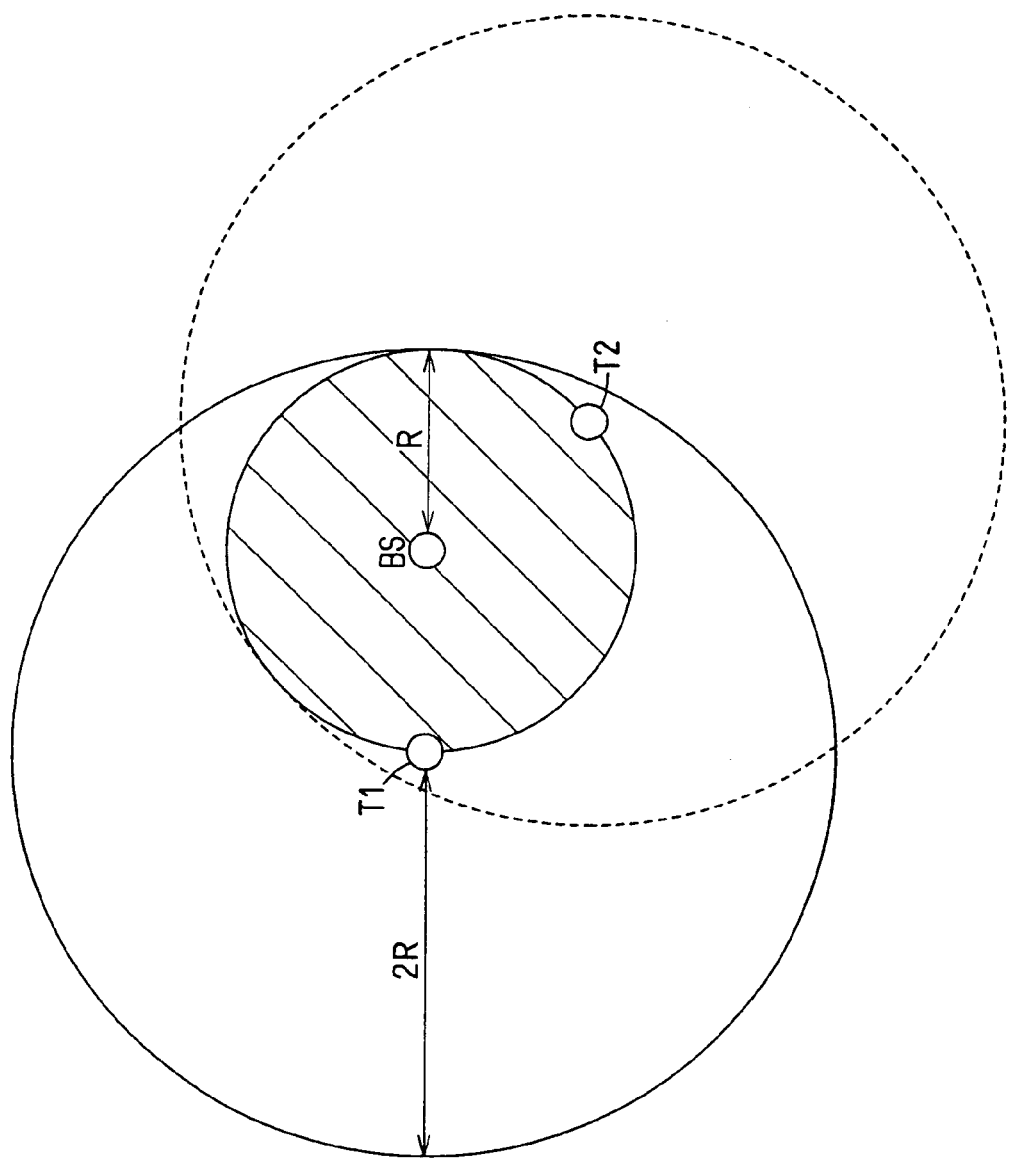

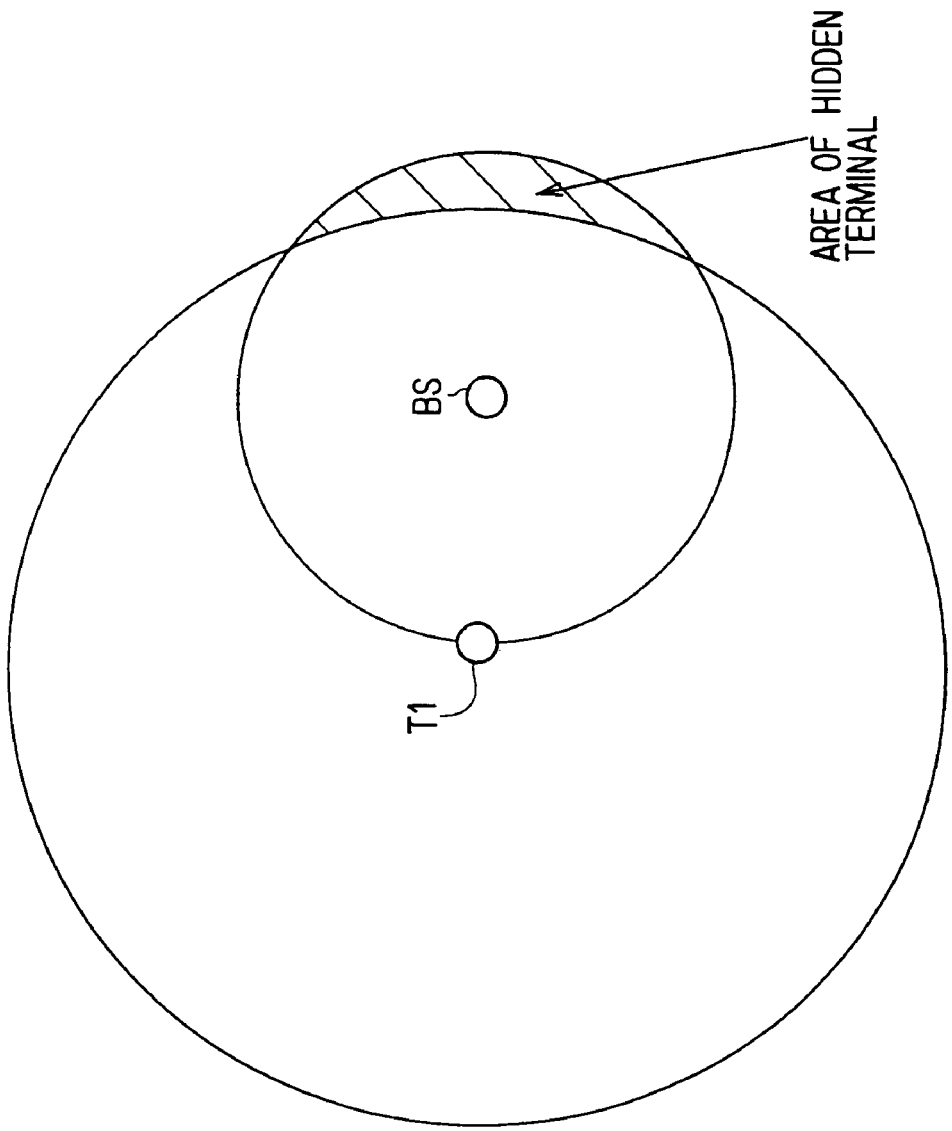

CSMA WIRELESS LAN HAVING ANTENNA DEVICE AND TERMINAL STATION

CROSS REFERENCE TO RELATED APPLICATION

This application is based on and incorporates herein by reference Japanese Patent Application No. 11-333116 filed Nov. 24, 1999.

BACKGROUND OF THE INVENTION

The present invention relates to a CSMA wireless local area network having an antenna device and a terminal station.

A local area network (LAN) is developed in recent year. Because LAN is convenient even wired, and more if wireless, a high speed wireless LAN of transfer rate over 10 Mbps is considered for practical use.

One of access method in the high speed LAN is CSMA (carrier sense multiple access), used in the Ethernet. CSMA is a method in which each terminal station senses carrier to check the traffic on a channel for determining whether or not to send a frame. A terminal station that has frames to be sent on the network senses the carrier before transmission. If the carrier is not sensed at this time, the terminal station determines that other terminal stations are not sending frames and start transmission of its frames. If the carrier is sensed, the terminal station determines that another terminal station is sending frames and postpones its transmission.

In CSMA, the communication condition is that the carrier may be sensed between each of terminal stations. Therefore, as shown in FIG. 18, the communication area of a base station BS may be assumed a circle of radius R, the communication area that terminal stations T1 and T2 have to secure will be a circle of radius 2R.

However, the above formation area is under an ideal environment. In the practical environment, there may exist fluctuation on the transmission link, and obstacles that block radio wave such as walls, impeding the radio wave from reaching to the mated terminal station. The terminal station that the radio wave transmission signal may not be reached is referred to as a "hidden terminal station". FIG. 19 shows an example of communication area that may have such a hidden terminal station. If there is a hidden terminal station, the carrier sense may not work effectively thereto, the frequency of collision of transmission frames may rise in the CSMA. Since the collision frames are rejected, the throughput characteristics that indicates the amount of transmitted information for a unit of time will be lessened.

In order to solve this problem, as disclosed in Japanese Unexamined Patent Publication No. H09-247187, a method has been devised in which a base station uses a sector type antenna to perform carrier sense for each sector and a signal selector switches sectors to alleviate the collision of frame packets. Although this method may avoid collision of packets, it may lessen the throughput of overall network because the communication area is still formed in a way that a hidden terminal station may exist.

SUMMARY OF THE INVENTION

The present invention has been made in view of the above circumstances and has an object to overcome the above problem and to provide a CSMA wireless LAN antenna device and terminal station for decreasing the number of hidden terminal stations.

According to the present invention, a CSMA wireless LAN comprises a base station and a plurality of terminal stations. The base station includes a plurality of antenna elements, power detectors and a controller. The power detectors detect the power received by the antenna elements and determine whether there are at least two terminal stations transmitting signals to the base station. If there are two, the base station notifies the transmitting terminal stations to increase its signal transmitting power. The notified terminal stations increase the signal transmitting power thereby widening a communication area, so that a hidden terminal station is enabled to perform communications.

The base station may be constructed to notify the terminal stations of sector information, and hidden terminal station information or received power information. The notified terminal station operates to change the directivity of its antenna.

BRIEF DESCRIPTION OF THE DRAWINGS

The above and other objects, features and advantages of the present invention will become more apparent from the following detailed description made with reference to the accompanying drawings. In the drawings:

FIG. 5 is a timing chart illustrating the operation of a variation of the first preferred embodiment of the present invention;

FIG. 15 is a schematic diagram illustrating an array antenna in a terminal station in accordance with a fourth preferred embodiment of the present invention;

FIG. 16 is a schematic diagram illustrating the effect of the fourth preferred embodiment of the present invention;

FIG. 18 is a schematic diagram illustrating a communication area of a CSMA wireless LAN in accordance with the related art; and FIG. 19 is a schematic diagram illustrating a hidden terminal station according to the related art.

DETAILED DESCRIPTION OF THE PREFERRED EMBODIMENT

A detailed description of some preferred embodiments embodying the present invention will now be given referring to the accompanying drawings.

First Embodiment

Figure 1:
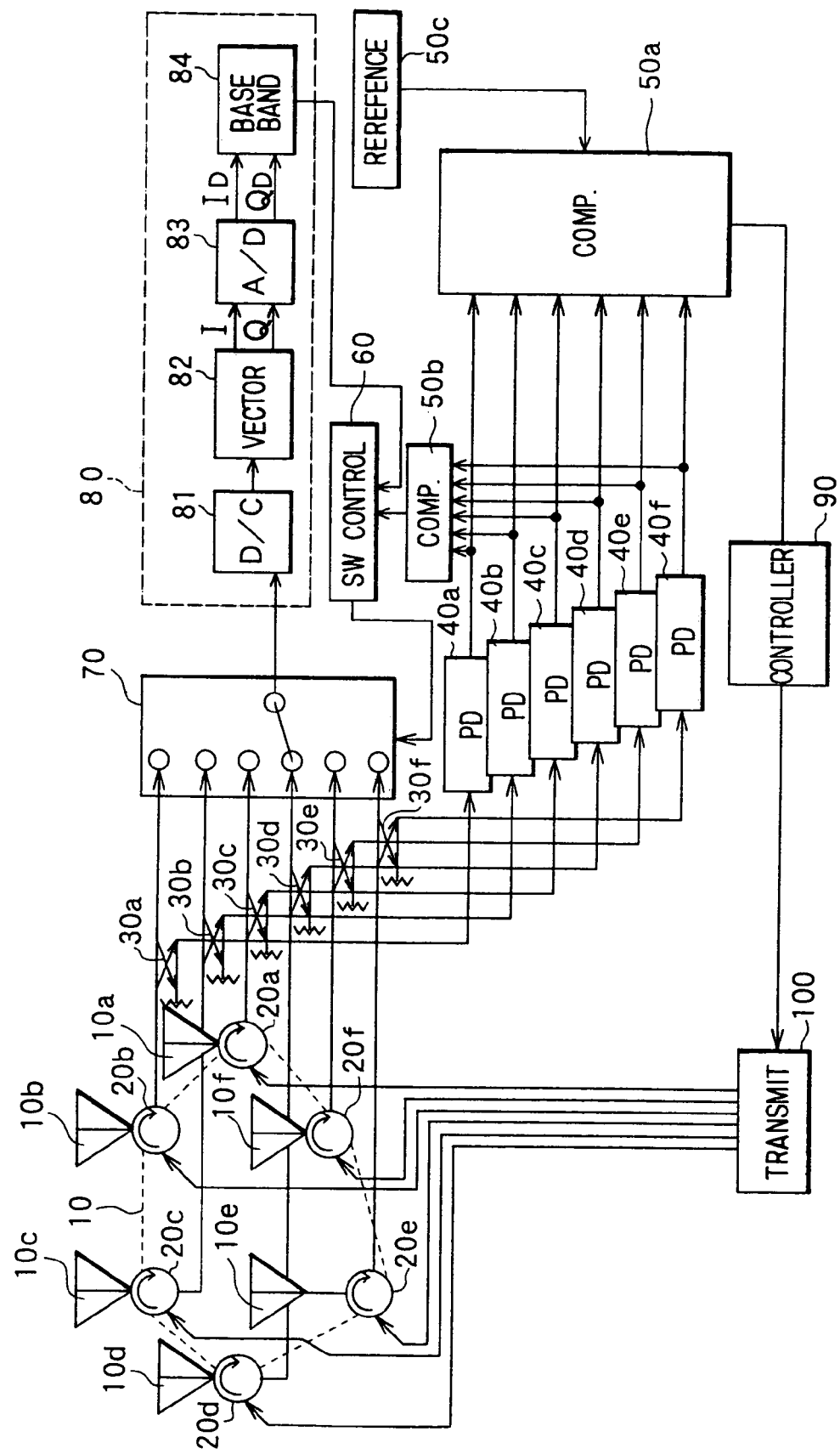
FIG. 1 is a schematic block diagram of electric circuit in a base station in accordance with a first preferred embodiment of the present invention.
Figure 2:
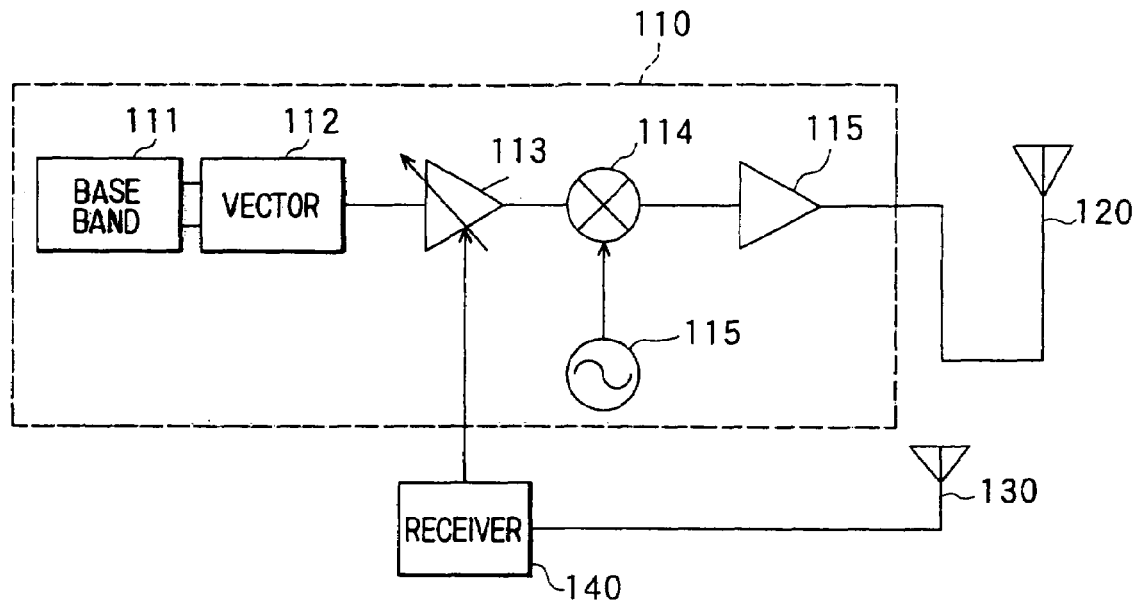
FIG. 2 is a schematic block diagram of electric circuit in a terminal station in accordance with the first preferred embodiment of the present invention.

Referring to FIGS. 1 and 2, there is shown a first embodiment of a CSMA wireless LAN. The CSMA wireless LAN comprises a base station, and a plurality of terminal stations that communicates with the base station.

The base station includes, as shown in FIG. 1, a sector antenna 10, circulators 20a–20f, directional couplers 30a–30f, power detectors (PD) 40a–40f, comparators 50a, 50b, a reference power generator 50c, a switch controller unit 60, a switch unit 70, a receiver unit 80, a controller unit 90, and a transmitter unit 100.

Figure 17:
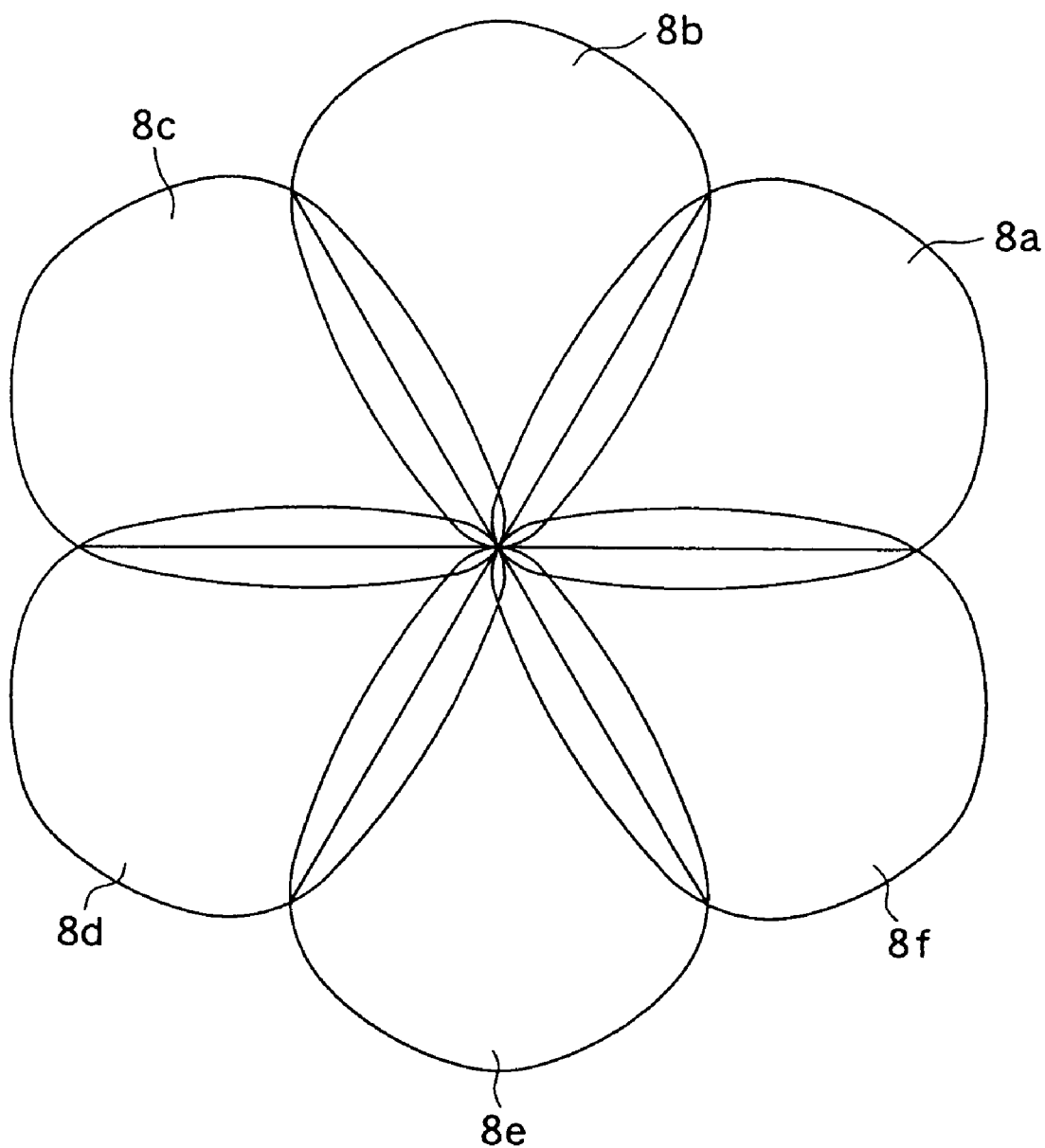
FIG. 17 is a schematic diagram of sectors formed by a base station in accordance with a related art.

The sector antenna 10 includes antenna elements 10a-10f disposed at regular intervals in a disc form, each of which has respective directivity in a specific (different) direction, as shown in FIG. 17, for forming a communication area comprised of beams 8a-8f. Each of beams serves either of a plurality of terminal stations.

The power detectors 40a-40f is served for calculating the received power of each of antenna elements 10a–10f. That is, the power detectors 40a-40f detect and calculate the received power of each of antenna elements 10a-10f through the circulators 20a-20f and the directional couplers 30a-30f.

The comparator (monitor) 50a compares the calculated power derived from the power detectors 40a–40f with the reference power supplied from the reference power generator 50c to generate signals indicative of the antenna elements among antenna elements 10a–10f having the received power more than the reference power. These signals are referred to as received power signals. The comparator 50a estimates the number of terminal stations being in transmitting operation.

The comparator 50b compares the calculated power derived from each of the power detectors 40a–40f to detect the power detector that calculates the maximum received power of the power detectors 40a–40f. In other words, the comparator 50b searches the antenna elements to determine the one having the maximum received power from within the antenna elements 10a–10f to output to the switch controller unit 60 the search signals indicative of the searched and identified antenna element.

The switch controller unit 60 couples by means of the switch unit 70 the antenna element indicated by the search signals and the receiver unit 80. The receiver unit 80 thereby demodulates the receiving signals only from the antenna element having the maximum received power.

The receiver unit 80 includes a down converter (d/c) 81, a vector demodulator 82, an analog-to-digital (A/D) converter 83, and a base band circuit 84. The down converter 81 receives the radio frequency (RF) signals from the antenna elements of the sector antenna 10 through the switch unit 70 to convert thus received RF signals to IF signals.

The vector demodulator 82 performs d.c./a.c. modulation of IF signals from the down converter 81, while the A/D converter 83 converts the d.c./a.c.-modulated signals (I, Q) from the down converter 81 to digital signals ($I_D$, $Q_D$).

The base band circuit 84 outputs to the switch controller unit 60 the inhibition signals for inhibiting the switching by the switch unit 70 during receiving from beginning of receiving the transmitted packet from a given terminal station as the digital signals ($I_D$/ $Q_D$) until terminating the receiving.

The receiver unit 80 thereby avoids the interruption during receiving the transmitted packet since the switching between the sector antenna 10 and the receiver unit 80 by the switch unit 70 is inhibited during receiving the packet transmitted from a given terminal station, even when receiving the packet transmitted from another terminal station at a transmission power larger than that of the given terminal station.

Here, if the base band circuit 84 fails to detect a preamble (starting signal) indicative of the beginning of transmitting packet as digital signal signals ($I_D$, $Q_D$) , it will be determined that the transmission packet is not correctly received and the packet will be rejected.

The controller unit 90 will determine, in response to the comparison signal derived from the comparator 50a, whether a hidden terminal station is present or absent, in order to perform the necessary process for eliminating any hidden terminal station. The transmitter unit 100 that is controlled by the controller unit 90 outputs control signals for eliminating the existence of hidden terminal stations through the circulator to the sector antenna 10. The sector antenna 10 in turn transmits the control signals. For the control signals, the signal for directing increase of transmission power of terminal stations is used.

Next, referring to FIG. 2, the electric circuit arrangement of a terminal station in the CSMA wireless LAN system will be described below in greater details. As shown in FIG. 2, the terminal station is comprised of a transmitter 110, a transmitting antenna 120, a receiving antenna 130, and a receiver 140. The transmitter 110 is comprised of a base band circuit 111, a vector modulator 112, a variable gain amplifier 113, a mixer 114, a local oscillator 115, and a power amplifier 116.

When a transmitting packet is generated, the base band circuit 111 outputs the transmitting packet as transmitting signals. The vector modulator 112 performs vector modulation on the transmitting packet to output modulated signals, while the variable gain amplifier 113 linearly amplifies the modulated signals on the basis of the control voltage derived from the receiver 140 to output thus amplified signals.

The mixer 114 combines the amplified signals from the variable gain amplifier 113 with the signals from the local oscillator 115 to output mixed signals. The power amplifier 116 amplifies the power of the mixed signals from the mixer 114 to output power amplified signals to the receiving antenna 130 through the circulator 120.

The transmitting antenna 120 transmits the transmitting packet as the power amplified signals, while the receiving antenna 130 receives the carrier signals from other terminal stations, or the control signals from the base station. The receiver 140 which receives the control signals from the base station (in order to direct to increase the transmission power in the terminal stations) outputs to the variable gain amplifier 113 the control voltage for increasing the gain in the variable gain amplifier 113 of the transmitter 110.

The variable gain amplifier 113 thereby increases the gain on the basis of the control voltage as described above. The receiver 140, when receiving the carrier from another terminal station through the receiving antenna 130, stops transmitting the transmitting packet by the transmitter 110 to the base station, and thereafter it starts the transmission of packets when the carrier is no longer detected. The transmissions of the control signal described above and of the transmitting signals as packet are performed on respective dedicated channels, different one from another.

Figure 4:
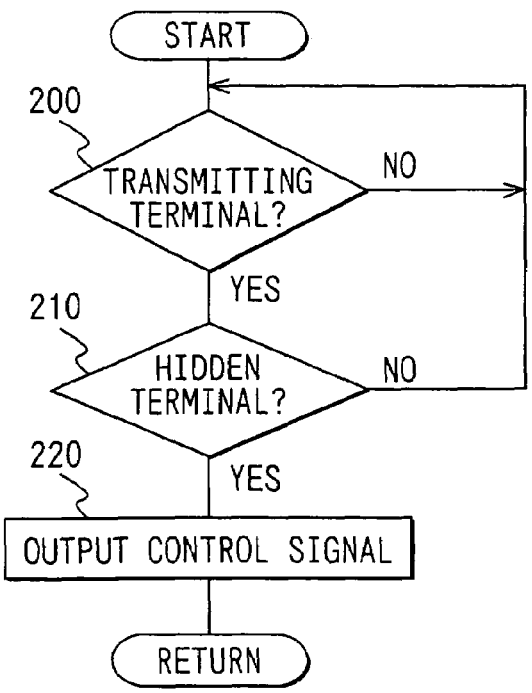
FIG. 4 is a flow chart illustrating the operation of a controller unit shown in FIG. 1.
Figure 3:
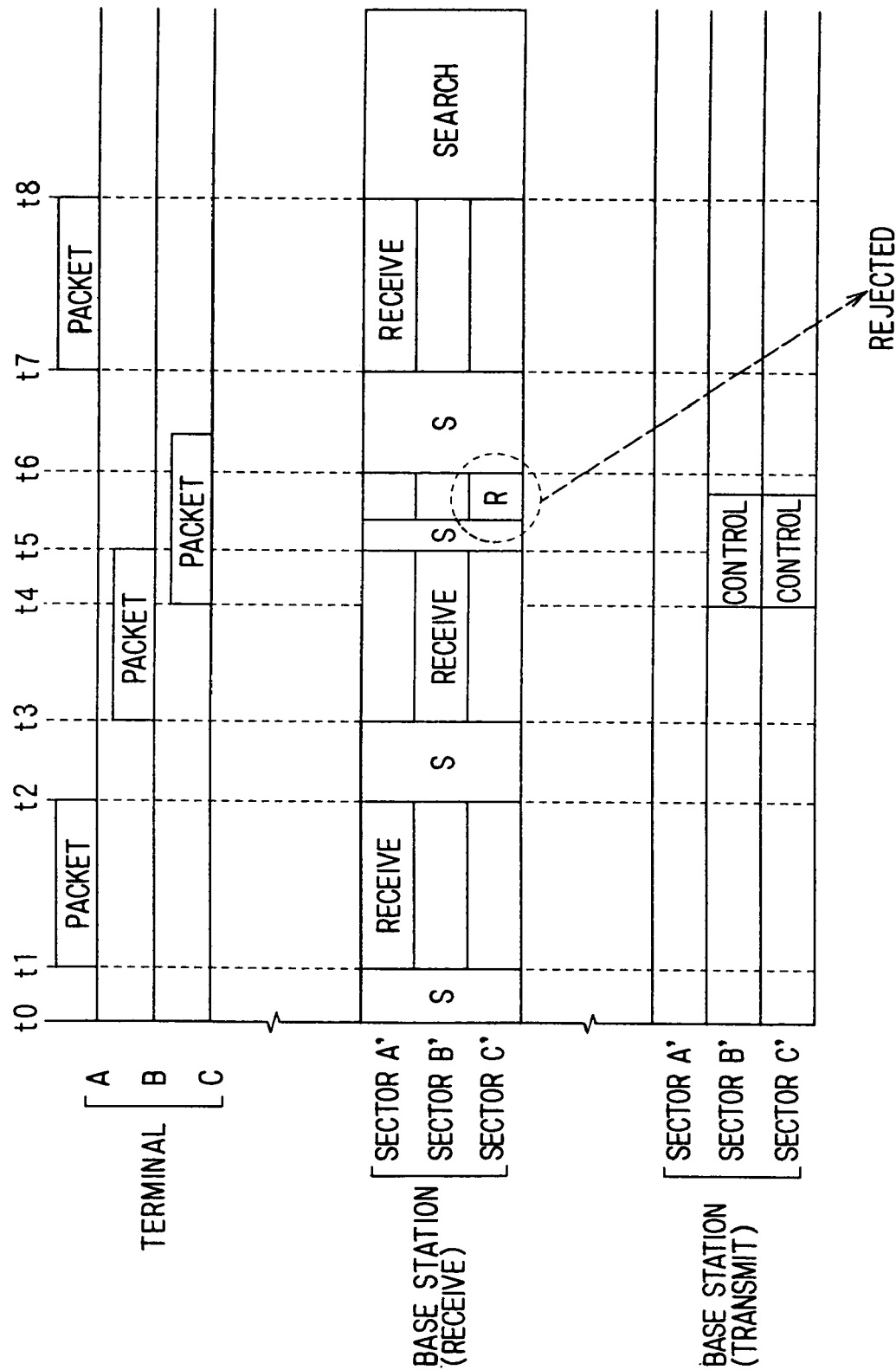
FIG. 3 is a timing chart illustrating the operation of first preferred embodiment of the present invention.

The operation of the first embodiment will be described with reference to FIGS. 3 and 4. FIG. 3 shows a timing chart. The terminal station A and the terminal station B shown in FIG. 3 are mutually hidden terminal stations for each other. FIG. 4 is a flow chart illustrating the operation of the controller unit 90 in the base station shown in FIG. 1. The controller unit 90 performs processing steps in accordance with the flow chart shown in FIG. 4.

At time t0, the comparator 50b in the base station searches the received power of each of sectors A'-C', in correspondence with the calculated power derived from the power detectors 40a–40f. The searching operation and receiving operation are indicated by S and R in FIG. 4, respectively. At time t1, the terminal station A transmits a packet as transmission signals, which signals will be received by the base station.

Here, an antenna element among the antenna elements 10a-10f corresponding to the terminal station A will have the maximum received power. Therefore the comparator 50b will output search signals indicative of the sector A' to the switch controller unit 60. Then the switch controller unit 60 will connect the antenna element corresponding to the terminal station A and the receiver unit 80, by means of the switch unit 70. The receiver unit 80 thereby receives the transmission packet from the terminal station A as receiving signals to start demodulation thereof.

At time t2, when the base band circuit 84 of the receiver unit 80 of the base station determines that the reception of the transmitted packet is terminated, the comparator 50b searches the received power of each of sectors A'-C'. At time t3, the terminal station B transmits the transmission packet as transmitting signals, which signals will be received by the base station.

At this time, an antenna element corresponding to the terminal station B among the antenna elements 10a-10f will have then the maximum received power. The comparator 50b will output search signals indicative of the sector B' to the switch controller unit 60. The switch controller unit 60 in turn will connect the antenna element corresponding to the terminal station B with the receiver unit 80 by means of the switch unit 70. The receiver unit 80 thereby starts signal processing of the packet transmitted from the terminal station B.

At this point, the comparator 50a will output the received power signals indicative of sector B' to the controller unit 90 on the basis of the calculated power derived from the power detectors 40a–40f. Then the controller unit 90 which receives from the comparator 50a the reception power signals indicative of sector B' determines that there exists a terminal station transmitting signals (step 200).

At time t4, the terminal station C transmits a packet as transmitting signals, which will be received by the base station. The comparator 50a outputs the received power signals indicative of sector C' to the controller unit 90, on the basis of the calculated power derived from the power detectors 40a–40f.

At this point the controller unit 90, which receives the received power signals indicative of sector C' from the comparator 50a, will determine that there exists a hidden terminal station (step 210). In this step it will be determined that there are more than two transmitting terminal stations. Thereafter, the controller unit 90 directs the transmitter unit 100 to output the control signals for increasing the transmitting power of both the terminal station communicating with the base station (terminal station B) and the terminal station outputting the transmitting signals independent from the terminal station B (terminal station C), toward these terminal stations (step 220). The transmitter unit 100 then transmits the control signals to the terminal station B and to the terminal station C via the sector antenna 10.

The receiver 140 of the terminal station B receives the control signals described above to increase the gain of the variable gain amplifier 113 of the transmitter 110. The power of amplified signals drawn from the variable gain amplifier 113, power of mixed signals, power of power amplified signals, and ultimately the power of transmission from the receiving antenna 130 thus is increased.

On the other hand, the terminal station C, which receives the same control signals described above as similar to the terminal station B, also increases the transmission power of the receiving antenna 130. The communication area of both the terminal station B and the terminal station C are widened, so that the communication area of the terminal station B will encompass that of terminal station C, and the communication area of the terminal station C will encompass that of terminal station B as well.

Before transmission of the control signals described above from the base station, the terminal stations B and C are mutually hidden terminal stations, while on the other hand after transmission of the control signals from the base station, these hidden terminal stations are resolved.

Thereafter, at time t5, the base band circuit 84 of the receiver unit 80 of the base station checks to see the termination of reception of the transmission packet from the terminal station B, the comparator 50b then searches the received power of each of the sectors A'-C', and outputs search signals indicative of sector C' to the switch controller unit 60. The switch controller unit 60 in turn will connect the antenna element corresponding to the terminal station C with the receiver unit 80 by means of the switch unit 70 to allow the receiver unit 80 to start signal processing of transmission packet from the terminal station C.

Then, at time t6, the base band circuit 84 of the receiver unit 80 determines that the transmission packet is not correctly received, since it receives the transmission packet from the terminal station C partially at the middle thereof. The receiver unit 80 will reject the transmission packet. The comparator 50b will search the received power of each of sectors A'-C'.

At time t7, the terminal station A transmits a packet, which packet will be received by the base station. The receiver unit 80 will start the signal processing of transmitted packet from the terminal station A. At time t8, when the base band circuit 84 determines the termination of receiving of the transmitted packet described above, the comparator 50b will search the received power of each of the sectors A'-C'.

As described above, the controller unit 90 determines in response to the calculated power derived from the power detectors 40a–40f that the terminal station B is a hidden terminal station for the terminal station C while at the same time the terminal station C is a hidden terminal station for the terminal station B, and directs to increase the transmission power of the terminal stations B and C. Then because of the enlarged communication area of both terminal stations B and C, the communication area of the terminal station B may encompass the terminal station C, and the communication area of the terminal station C may also encompass the terminal station B. Therefore any hidden terminal stations may be resolved so that a communication area without the hidden terminal stations may be formed, allowing the throughput characteristics to be improved.

In the first preferred embodiment, at time t5 shown in FIG. 3, although the comparator 50b searches the received power of each of sectors A'–C', the comparator 50b may otherwise search the received power of sectors A' and B' except for sector C'.

Figure 6:
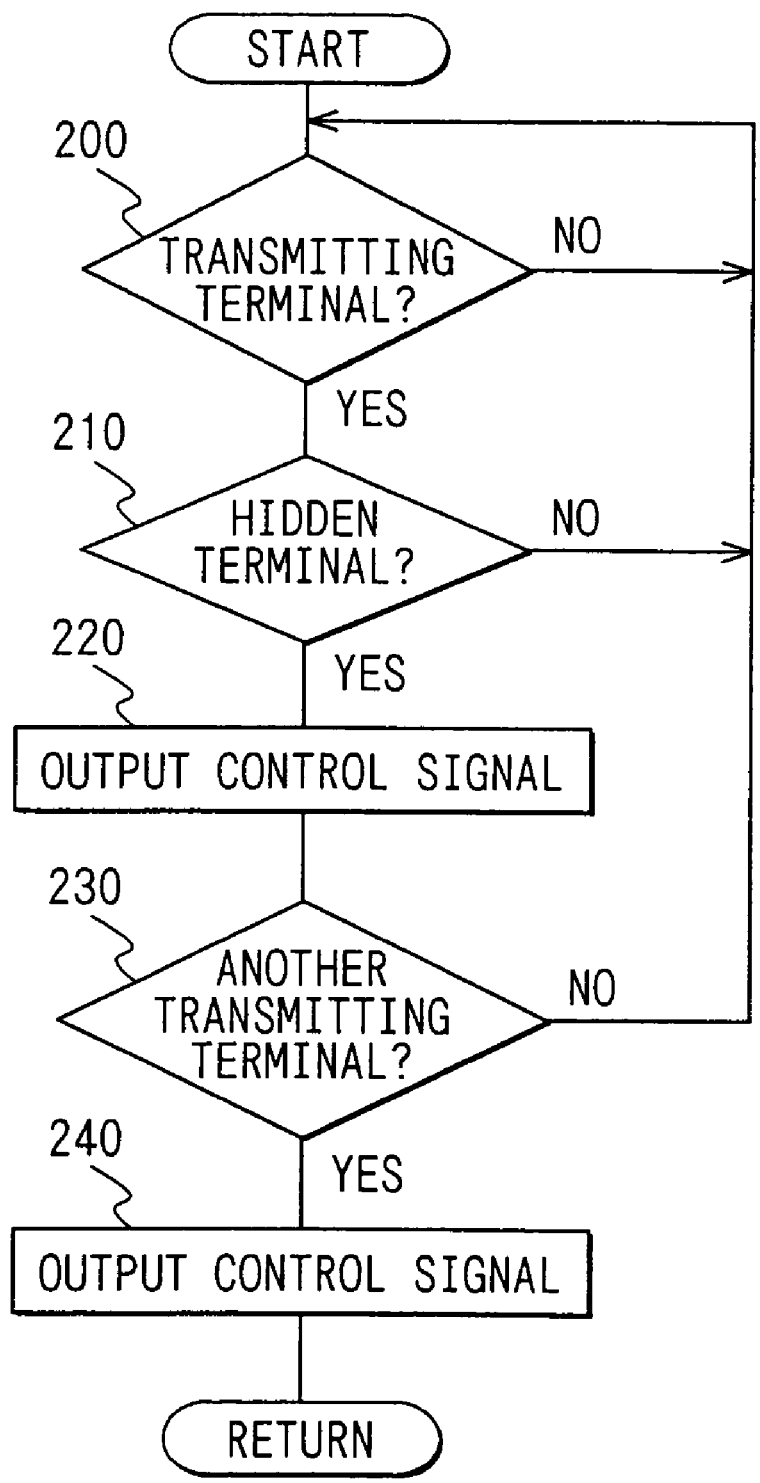
FIG. 6 is a flow chart illustrating the operation of a controller unit of the variation of the first preferred embodiment of the present invention.

A timing chart in such a case is shown in FIG. 5, as well as a flow chart indicative of the operation of the controller unit 90 in FIG. 6. Steps 200–220 shown in FIG. 6 are identical to steps 200–220 shown in FIG. 4. The operation after time t5 in FIG. 5 will be described herein below in greater details.

At time t5, the comparator 50b searches the received power of sectors A' and B'. Even though the terminal station C is sending packets, at time t6', a transmitting packet is sent from the sector A' and the base station receives the packet transmitted from the terminal station A.

The comparator 50a at this point outputs to the controller unit 90 the received power signal indicative of the sector A' on the basis of the calculated power derived from the power detectors 40a–40f. Then the controller unit 90 will determine that there is another, new reception of received power signals upon reception of the received power signals indicative of the sector A' (step 230), and will cause the transmitter unit 100 to send the control signals for increasing the transmission power to the terminal station A (step 240). Then the terminal station A is allowed to increase the transmission power to the antenna 130.

As have described above, the transmission packet during the transmission of packet from the terminal station B (at time t4) is started to transmit, the base station cannot correctly receive the transmission packet from the terminal station C.

Then, at time t5, even though the terminal station C is sending a packet, the comparator 50b will search the received power of the sector A' and B', except for the sector C'. As a result, at time t6', the base station may correctly receive the transmitted packet from the terminal station A even though the terminal station C is transmitting a packet, so that the throughput characteristics will be improved more than the throughput in the first preferred embodiment.

As described above, the terminal station A do transmit a packet (at time t6') even though the terminal station C is sending a packet. This means that the terminal station A may be a hidden terminal station for the terminal station C. The base station may direct terminal station A to increase the transmission power of the receiving antenna 130 such that the communication area of the terminal station A may be enlarged and may encompass the terminal station C.

Furthermore, in the first preferred embodiment, the transmission power is commanded to increase for both the terminal station that is in communication with the base station and another terminal station that outputs the transmission signals other than the communicating one, in case it is determined that a hidden terminal station exists. It may be realized, however, in such a way that either one of the terminal station communicating with the base station and the terminal station that outputs the transmission signals other than the communicating one may be commanded to increase the transmission power.

Also in the first preferred embodiment, although the base station outputs the control signals to a hidden terminal station in order to increase the gain in the variable gain amplifier 113 of the transmitter 110, it may be possible that the base station outputs the received power information to the hidden terminal station in addition to the control signals.

For example, when the terminal station B is transmitting a packet to the base station, if the terminal station C attempts to send a transmitting packet, the base station may output the received power information indicative of the received power from the terminal station B at the base station as well as the received power information indicative of the received power from the terminal station C at the base station to both the terminal stations B and C.

In this case, the terminal station C, in response to both the received power information indicative of the received power from the terminal station B at the base station as well as the received power information indicative of the received power from the terminal station C at the base station, may calculate the distance between the terminal station C and the terminal station B. Then the terminal station C calculates the transmission power level in correspondence with thus calculated distance so as to transmit a packet at the level of thus calculated transmission power. The terminal station B on the other hand calculates the distance between the terminal station C and the terminal station B in a manner similar to that of the terminal station C, and then calculates the transmission power level in correspondence with thus calculated distance so as to transmit a packet at the level of thus calculated transmission power.

In the first preferred embodiment, although a transmission antenna and a reception antenna are used in a terminal station, it may be realized with only one antenna, which may be used for both transmission and reception.

In addition, in the first preferred embodiment, although an antenna used for both transmission and reception is used at the base station, it may be realized with both the antenna dedicated for transmission and the antenna for reception.

Second Embodiment

In general, a base station is situated at about center of a plurality of terminal stations, the distance of two terminal stations among the plural terminal stations may be farther if these two terminal stations are located at the points of symmetry around the base station. Thus when two terminal stations are located at the points of symmetry around the base station, it is highly possible that these two terminal stations may become mutually hidden terminal stations each other.

In the second embodiment, when a terminal station D is sending packets to the base station, another terminal station E is determined to exist which sends packets, the base station considers that these terminal stations E and D are located at the symmetrical points around the base station, and directs the terminal station E to change the orientation of directivity of the terminal station E toward the base station, namely the sector in which the terminal station D is located (sector D').

In the second embodiment, when the controller unit 90 of the base station shown in FIG. 1 determines that there is a hidden terminal station (step 210), it outputs sector information indicative of the sector E' in which the terminal station E is located, and hidden terminal station information indicating that the terminal station E is a hidden terminal station as the control signals, through the transmitter unit 100 and the sector antenna 10 (step 220). It should be noted that the angular information indicative of the angle with respect to the reference orientation in the sector E' is used as the sector information. Number information indicative of the number of the terminal station E may be used as the sector information by assigning previously a number to each terminal station in a sector.

The terminal station E obtains the orientation of the base station on the basis of the sector E' with reference to the angular information (sector information) indicative of sector E', so that the terminal station E may point the directivity orientation to the base station. The communication area of the terminal station D may thereby encompass the terminal station E to eliminate a hidden terminal station.

In the following description the terminal station D which directs its directivity to the orientation of the base station will be described in greater details, with reference to FIG. 7.

Figure 7:
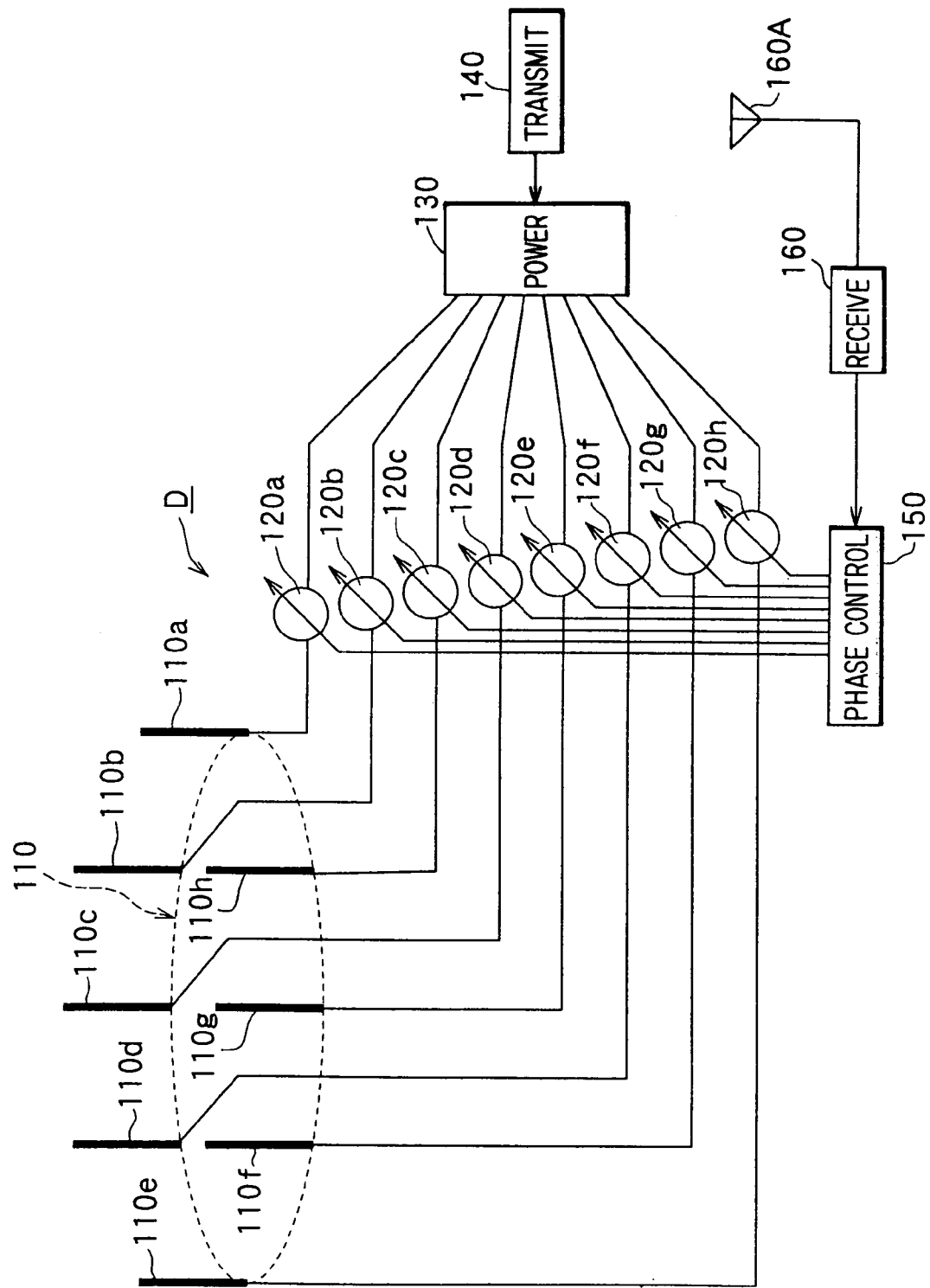
FIG. 7 is a schematic block diagram of electric circuit in a terminal station in accordance with a second preferred embodiment of the present invention.

As shown in FIG. 7, the terminal station D has an array antenna (round shaped ladder array antenna) 110, variable phase generators 120a–120h, a power distributor 130, a transmitter 140, a phase controller 150, a receiver 160, and a receiver antenna 160A. The array antenna 110 is comprised of dipole antenna elements (which have omnidirectivity in the horizontal plane) 110a–110h disposed in a fixed interval in a form of disk. For the array antenna 110 some monopole antenna elements may be used instead of dipole antenna elements 110a–110h.

The transmitter 140 outputs a packet to be transmitted to the array antenna 110 through the power distributor 130 and the phase controller 150. Each of the dipole antenna elements 110a-110h of the array antenna 110 outputs the packet as transmission signals by using the radio wave as medium. The dipole antenna elements 110a-110h thereby form a transmission beam in response to the transmission signals.

The receiver 160 receives the control signals described above through the receiver antenna 160A to obtain the orientation of the base station on the basis of the terminal station D in response to the angular information included in the control signals. The power distributor 130 controls variable phase generators 120a-120h in accordance with the orientation of the base station with respect to the terminal station D.

The phase of transmission signals output from the power distributor 130 to the dipole antenna elements 110a–110h are altered thereby. The directivity of the array antenna 110, and consequently the transmission beam is directed to the orientation of the base station, the sector D', in correspondence with the amount of phase change in each transmission signal.

Figure 8:
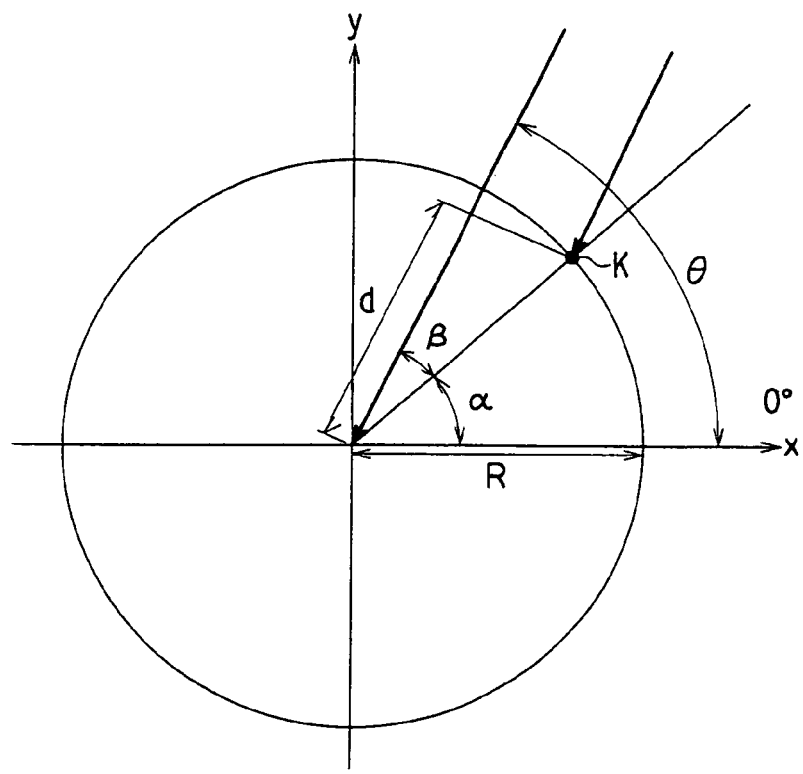
FIG. 8 is a schematic diagram illustrating the directivity of array antenna in the second preferred embodiment of the present invention.

The directivity control of the array antenna 110 will be described with reference to FIG. 8. In FIG. 8, it is assumed that K (=8) elements are disposed in an array at the regular interval on a circle of radius R and the k-th antenna element therewithin is indicated as a black dot.

Here if radio wave (transmitted packet) arrives from the θ orientation viewed from the center of circle of radius R (in FIG. 8 in a counterclockwise direction with respect to the X axis direction), the difference of path "d" between the path to the center of the circle of radius R for radio wave and the path to k-th antenna element for radio wave is given by the following equations (1) to (3):

$$\alpha = 2\pi \frac{(k-1)}{K} \quad \text{(eq. 1)}$$

$$\beta = \theta - \alpha \quad \text{(eq. 2)}$$

$$d = R\cos(\beta) = R\cos\left\{\theta - 2\pi\frac{(k-1)}{K}\right\} \quad \text{(eq. 3)}$$

Where α in the equation (1) is the counterclockwise angle with respect to the X axis orientation of the k-th antenna element, β in the equation (2) is an angular difference (in clockwise turn) between the arrival angle θ of radio wave with respect to the X axis orientation and the k-th antenna element.

When the difference of path "d" is expressed as phase difference by normalizing by the wavelength λ of the radio wave, as shown in equation (4) below, "d'" may be given:

$$d' = 2\pi \frac{d}{\lambda} \text{(rad)} \quad \text{(eq. 4)}$$

Then, when considering the center of circle as the reference point of phase, the orientation vector V indicative of item of receiving phase of each dipole antenna element may be given by the following equation (5):

$$V = \exp(jd') = \exp\left[j2\pi\frac{R}{\lambda}\cos\left\{\theta - 2\pi\frac{(k-1)}{K}\right\}\right] \quad \text{(eq. 5)}$$

Next, the amount of phase change in the phage generator for each antenna element is expressed by the complex weight W indicated in the following equation (6):

$$W = [\omega_1, \omega_2 \ldots \omega_k]^T \quad \text{(eq. 6)}$$

The output "y" of the array antenna is given by the following equation (7):

$$y = W^H V \quad \text{(eq. 7)}$$

Where T is the transposition, and H is the complex conjugated transposition. For the output "y" of this array antenna, when plotting the trace by sweeping θ from 0° to 360° in fine fraction, the directivity of the array antenna is drawn when given by a complex weight.

The formation of directivity in the second embodiment is done in accordance with the following process. At first, based on the angular information of terminal station (the orientation of base station with respect to the terminal station D), the restriction condition of weight is given so as to form a beam in the direction toward the base station.

In the second embodiment, for obtaining the weight restricting the orientation of directivity, the weight constraint condition in the directionally constrained minimization of power (DCMP) method, which is one of algorithms used for adaptive array antennas, is used. The equations working out the condition therefore will be the following equations (8)–(12):

$$C(\theta_1) = \left[\exp\left\{j2\pi\frac{R}{\lambda}\cos\left(\theta_1 - 2\pi\frac{0}{K}\right)\right\},\right. \quad \text{(eq. 8)}$$

$$\left.\exp\left\{j2\pi\frac{R}{\lambda}\cos\left(\theta_1 - 2\pi\frac{1}{K}\right)\right\}, \cdots \left\{j2\pi\frac{R}{\lambda}\cos\left(\theta_1 - 2\pi\frac{(K-1)}{K}\right)\right\}\right]^T$$

$$C(\theta_2) = \left[\exp\left\{j2\pi\frac{R}{\lambda}\cos\left(\theta_2 - 2\pi\frac{0}{K}\right)\right\},\right.$$

$$\left.\exp\left\{j2\pi\frac{R}{\lambda}\cos\left(\theta_2 - 2\pi\frac{1}{K}\right)\right\}, \cdots \left\{j2\pi\frac{R}{\lambda}\cos\left(\theta_2 - 2\pi\frac{(K-1)}{K}\right)\right\}\right]^T$$

-continued $$C(\theta_L) = \left[\exp\left\{j2\pi\frac{R}{\lambda}\cos\left(\theta_L - 2\pi\frac{0}{K}\right)\right\},\right.$$

$$\left.\exp\left\{j2\pi\frac{R}{\lambda}\cos\left(\theta_L - 2\pi\frac{1}{K}\right)\right\}, \cdots \left\{j2\pi\frac{R}{\lambda}\cos\left(\theta_L - 2\pi\frac{(K-1)}{K}\right)\right\}\right]^T$$

$$C = [C(\theta_1), C(\theta_2), \ldots C(\theta_L)]^T \quad \text{(eq. 9)}$$

$$H_n = A_n \exp(j\xi_n) \quad \text{(eq. 10)}$$

$$H = [H_1, H_2 \ldots H_L] \quad \text{(eq. 11)}$$

$$W = C(C_H C)^{-1} H^* \quad \text{(eq. 12)}$$

Where θ1–θL are restricted orientations, C is a constrained vector, H is a constraint response vector. The subscript H indicates a complex conjugate transposition. When putting 1 into H the beam will be directed to that orientation. When putting 0 into H, a null point in that orientation is formed.

Figure 9:
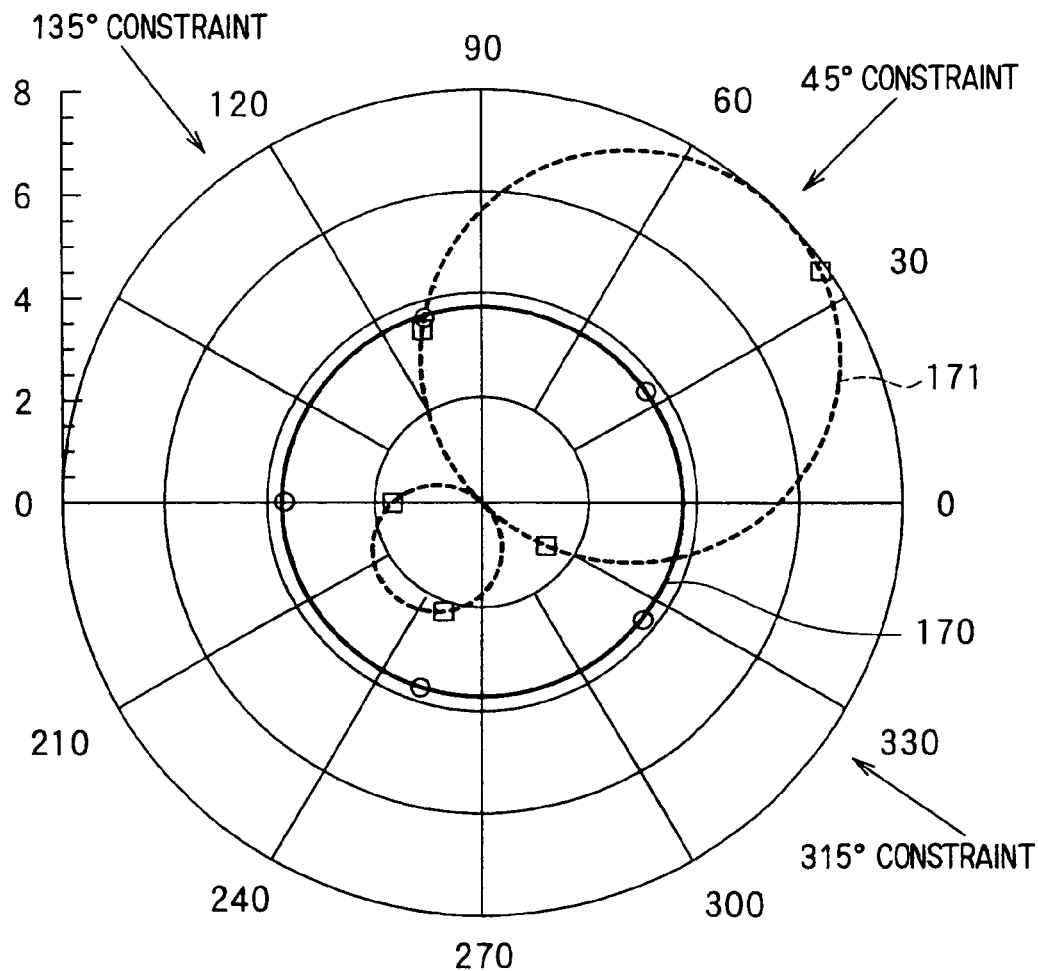
FIG. 9 is a schematic diagram illustrating the directivity of the array antenna.

At first, for the angular information from the base station, if information has been obtained indicating that the base station is located at the 45° in clockwise from the X axis direction, the constraint in that orientation is performed based on this information. FIG. 9 illustrates the directivity when using an array antenna having 8 antenna elements disposed on a circle circumference at a regular interval, with 0.25 wavelength of radius of circle of array antenna as shown in FIG. 7. Solid line 170 indicates the directivity when uniformly exciting the array antenna in every direction; solid line 171 indicates the directivity when constraining to 45°.

As can be appreciated from FIG. 9, a transmission beam directed toward 45°, with null points (direction to which no radio wave is radiated) at 150° and 330°. In the CSMA wireless LAN, each terminal station is required to perform carrier sense. If there is a null point in the directivity, the terminal station at that direction becomes a new hidden terminal station.

Figure 10:
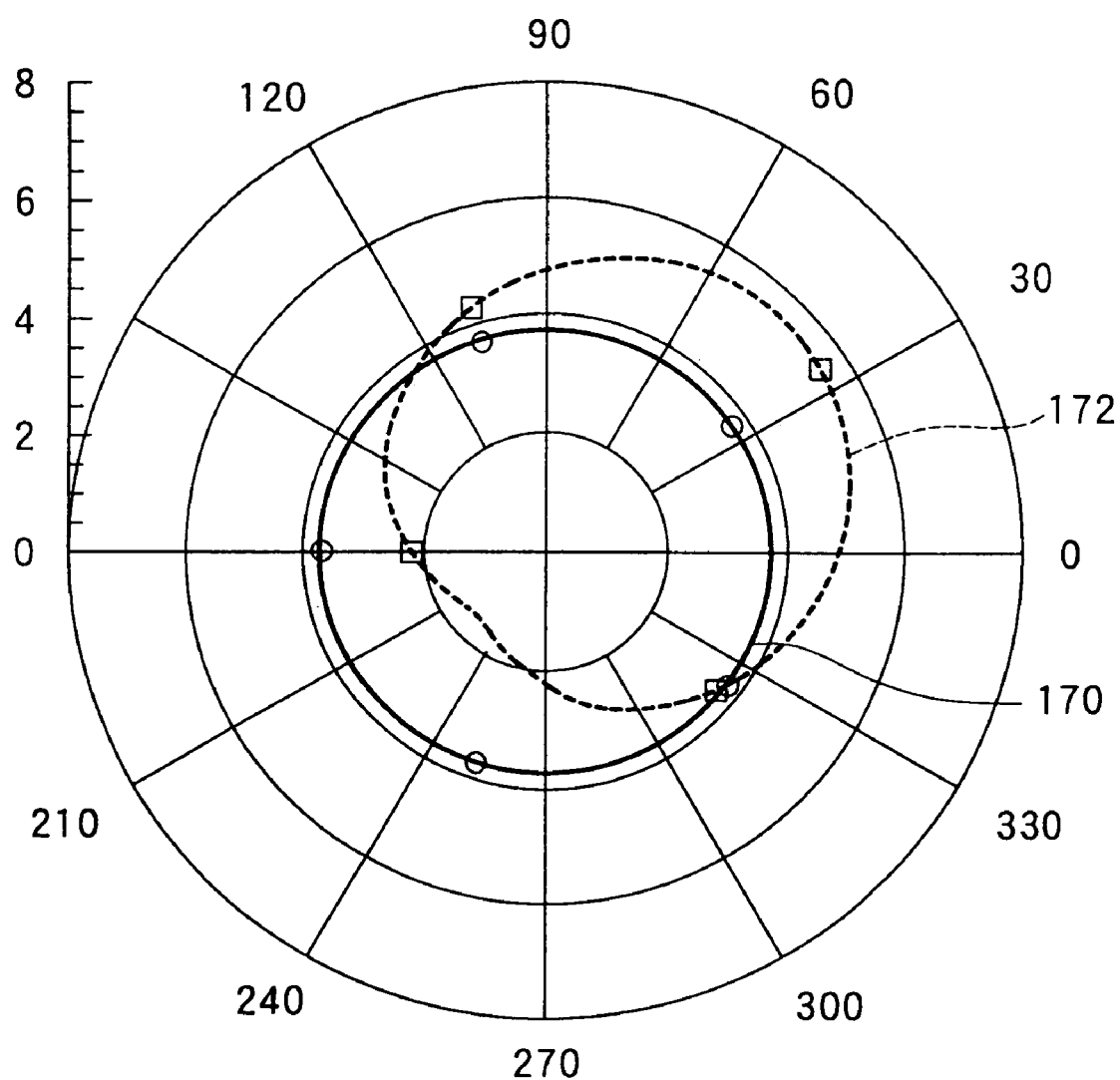
FIG. 10 is a schematic diagram illustrating the directivity of the array antenna.

The directivity when the region in the proximity of null points are constrained will be as shown in FIG. 10. When accurately matching the null point orientation and the constrained orientation, the directivity will be back to that when the array antenna is excited uniformly in omnidirection. Therefore in FIG. 10, 135° and 315°, which are away apart from the null points directions by 25° are constrained. This allows, as shown by dotted line 172, a directivity to be formed directed to 45° with no null point. In the second embodiment, the amount of phase in each variable phase generator will be given by the following equation (13):

$$[\omega_1\ \omega_2\ \omega_3\ \omega_4\ \omega_5\ \omega_6\ \omega_7\ \omega_8] = [23.7\ 15.5\ 23.7$$
$$0\ -23.7\ -15.5\ -23.7\ 0]\ (\text{degrees}) \quad \text{(eq. 13)}$$

The amount of phase change in each of variable phase generators as cited in equation (13) above is stored in the memory of the receiver 160, which receiver 160 will select the amount of phase change (weight) for each variable phase generator from within weight data stored in the memory in accordance with the angular information of the control signals.

Since each antenna element in the array antenna is symmetrically disposed at a distance from the center of circle, the same directivity may be formed for each 45° by circulating the phase described above. For example, when desired to form a similar beam at the orientation of 90°, the amount of phase will be given by the following equation (14):

$$[\omega_1\ \omega_2\ \omega_3\ \omega_4\ \omega_5\ \omega_6\ \omega_7\ \omega_8] = [0\ 23.7\ 15.5\ 23.7$$
$$0\ -23.7\ -15.5\ -23.7]\ (\text{degrees}) \quad \text{(eq. 14)}$$

Figure 11:
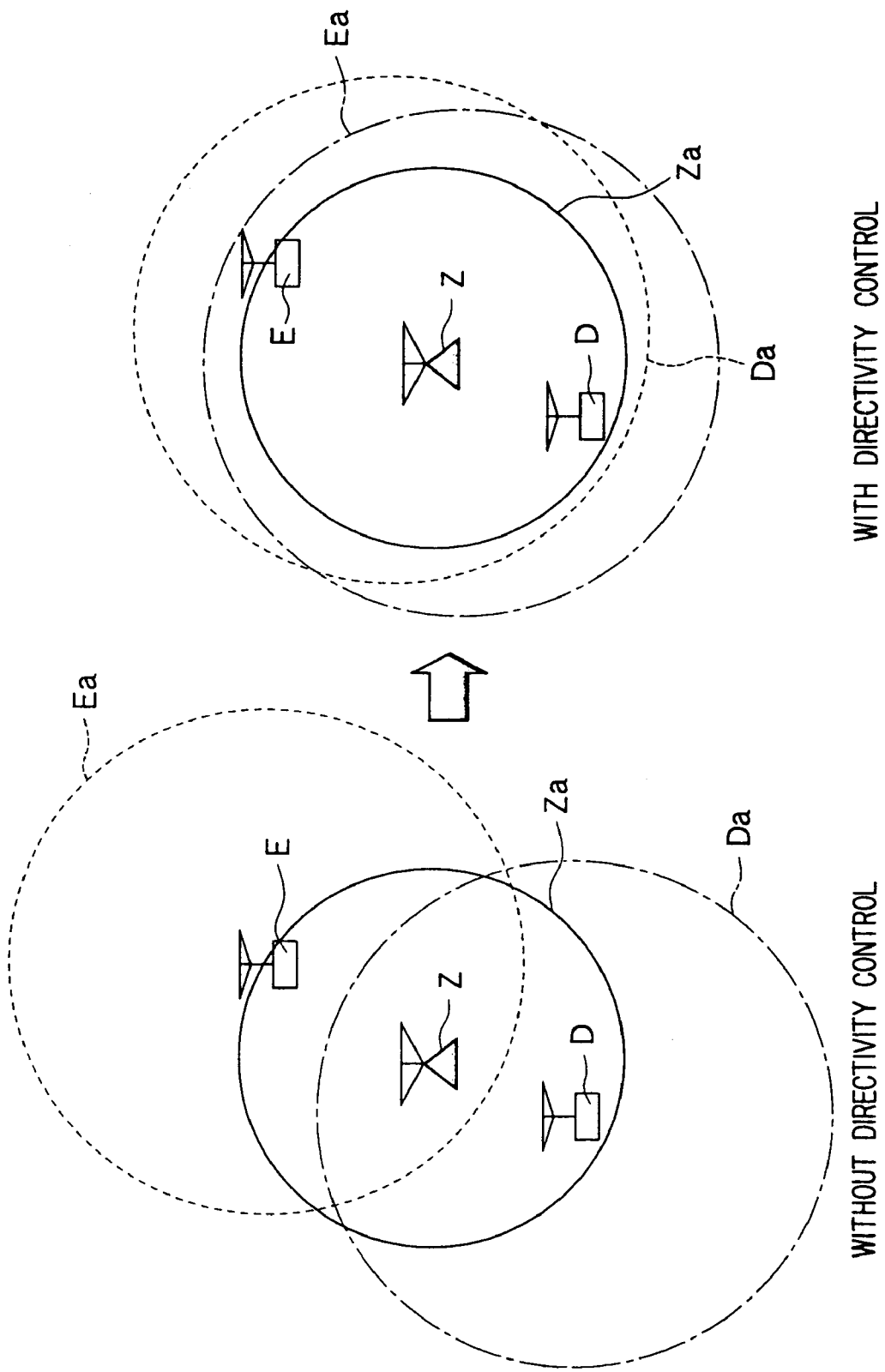
FIG. 11 is a schematic diagram illustrating the effect of the second preferred embodiment of the present invention.

Referring to FIG. 11, a model is shown which emphasize with and without the directivity control including a base station Z, communication areas Da and Ea of the terminal stations D and E, respectively. Za in the figure is designated to the communication area of the base station Z. Without the directivity control, the directivity of terminal stations D and E are omnidirectional. It is assumed there is an area that the carrier sense is ineffective. With the directivity control, the directivity is controlled so as to be formed in the orientation of the base station Z, allowing the terminal stations D and E to perform carrier sense, resulting in that a communication area is formed with no hidden terminal station.

Third Embodiment

In the second preferred embodiment, the amount of phase change (weight) of each variable phase generator is previously stored in the memory of the receiver 160 so as to be able to select the appropriate amount of phase change (weight) from within the complex conjugate weight data stored in the memory in accordance with the angular information of the control signals. However, the receiver 160 calculates the amount of phase change (weight) in the third embodiment.

In the third embodiment, the base station informs the terminal station E (or terminal station D) of the received power information from the terminal station E at the base station (received power information Eb) and the received power information from the terminal station D at the base station (received power information Db) as well as the sector information indicative of the sector E' and sector D° (angular information).

The receiver 160 of the terminal station E has to incorporate a processor for solving the complex weight W shown in equation (6) based on the sector information, received power information Db and Eb. In a practical situation, the terminal station D is situated at the 45° from the terminal station E with respect to the reference orientation (for example, X axis orientation).

Assuming θ=45° in equation (9), and H=1 in equation (10), the following equations (15) and (16) are obtained:

$$C(\text{rad}(45°)) = \left[\exp\left\{j2\pi\frac{R}{\lambda}\cos\left(\text{rad}(45°) - 2\pi\frac{0}{8}\right)\right\},\right. \quad \text{(eq. 15)}$$

$$\left. j2\pi\frac{R}{\lambda}\cos\left(\text{rad}(45°) - 2\pi\frac{1}{8}\right)\right\}, \cdots \exp\left\{j2\pi\frac{R}{\lambda}\cos\left(\text{rad}(45°) - 2\pi\frac{7}{8}\right)\right\}\right]^T$$

$$H = 1 \quad \text{(eq. 16)}$$

Where rad (θ) is a function for converting θ into radian.

At first, if the complex weight W in equation (6) is solved based on the constrained vector C in equation (15) and the constrained response vector H in equation (16), the directivity of the array antenna will become as shown by the chain line 171 in FIG. 9. In the directivity shown in FIG. 9, there are null points (orientation to which no radio wave is irradiated), the orientation of which will be the area that new hidden terminal stations may exist. Therefore, the proximity of null points is required to be constrained again.

Assuming the amount of offset for the newly constrained orientation of 45°, $\theta_{off}$, the constraining vector C and the constrained response vector H will be given by the following equations (17)–(21):

$$C = [c(rad(45°-\theta_{off})), c(rad(45°)), c(rad(45°+\theta_{off}))] \quad \text{(eq. 17)}$$

$$C(rad(45°)) = \left[ \exp\left\{ j2\pi \frac{R}{\lambda} \cos\left( rad(45°) - 2\pi \frac{0}{8} \right) \right\}, \right.$$
$$\left. j2\pi \frac{R}{\lambda} \cos\left( rad(45°) - 2\pi \frac{1}{8} \right) \right\}, \cdots \exp\left\{ j2\pi \frac{R}{\lambda} \cos\left( rad(45°) - 2\pi \frac{7}{8} \right) \right\} \right]^T \quad \text{(eq. 18)}$$

$$C(rad(45° - \theta_{off})) = \left[ \exp\left\{ j2\pi \frac{R}{\lambda} \cos\left( rad(45° - \theta_{off}) - 2\pi \frac{0}{8} \right) \right\}, \right.$$
$$\exp\left\{ j2\pi \frac{R}{\lambda} \cos\left( rad(45° - \theta_{off}) - 2\pi \frac{1}{8} \right) \right\},$$
$$\left. \cdots \exp\left\{ j2\pi \frac{R}{\lambda} \cos\left( rad(45° - \theta_{off}) - 2\pi \frac{7}{8} \right) \right\} \right]^T \quad \text{(eq. 19)}$$

$$C(rad(45° + \theta_{off})) = \left[ \exp\left\{ j2\pi \frac{R}{\lambda} \cos\left( rad(45° + \theta_{off}) - 2\pi \frac{0}{8} \right) \right\}, \right.$$
$$\exp\left\{ j2\pi \frac{R}{\lambda} \cos\left( rad(45° + \theta_{off}) - 2\pi \frac{1}{8} \right) \right\},$$
$$\left. \cdots \exp\left\{ j2\pi \frac{R}{\lambda} \cos\left( rad(45° + \theta_{off}) - 2\pi \frac{7}{8} \right) \right\} \right]^T \quad \text{(eq. 20)}$$

$$H = [1\ 1\ 1] \quad \text{(eq. 21)}$$

By substituting equation (6) with the constraining vector C and the constrained response vector H in equations (17)–(21) above, the optimized complex weight W is obtained.

The calculation process of $\theta_{off}$, the amount of offset in the receiver 160, will be described below.

Based on the sector information indicative of sector E' and the received power information Eb, the location (distance and orientation) of the terminal station E with respect to the base station will be calculated at first. Then, based on the sector information indicative of sector D' and the received power information Db, the location (distance and orientation) of the terminal station D with respect to the base station will be calculated.

Next, based on thus calculated location of the terminal station E and the calculated location of the terminal station D, the distance between the terminal station E and the terminal station D will be calculated. Then, based on thus calculated distance, the gain (antenna gain) between the terminal station E and the terminal station D will be calculated. Thus calculated gain means the gain of transmission beam.

Figure 12:
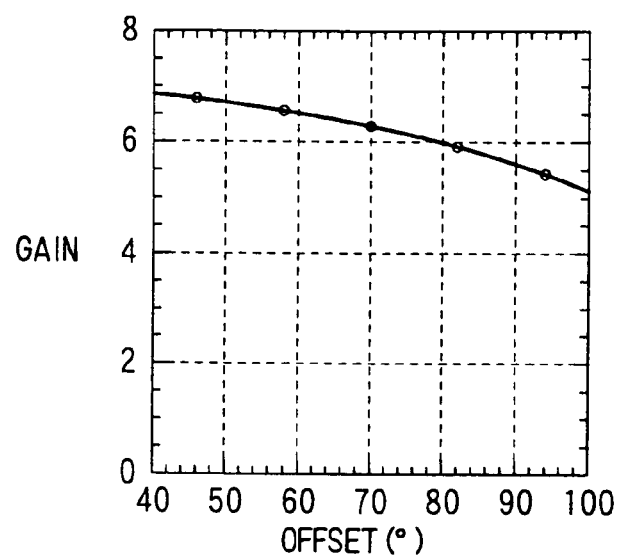
FIG. 12 is a schematic diagram illustrating the relationship between a gain and an offset value in accordance with a third preferred embodiment of the present invention.

Thereafter, thus calculated gain (antenna gain) is in relationship with the amount of offset $\theta_{off}$ as shown in FIG. 12. From the relationship shown in FIG. 12, the amount of offset $\theta_{off}$ is derived. The relationship between the antenna gain shown in FIG. 12 and the amount of offset $\theta_{off}$ is previously stored in the memory of the receiver 160.

Figure 13:
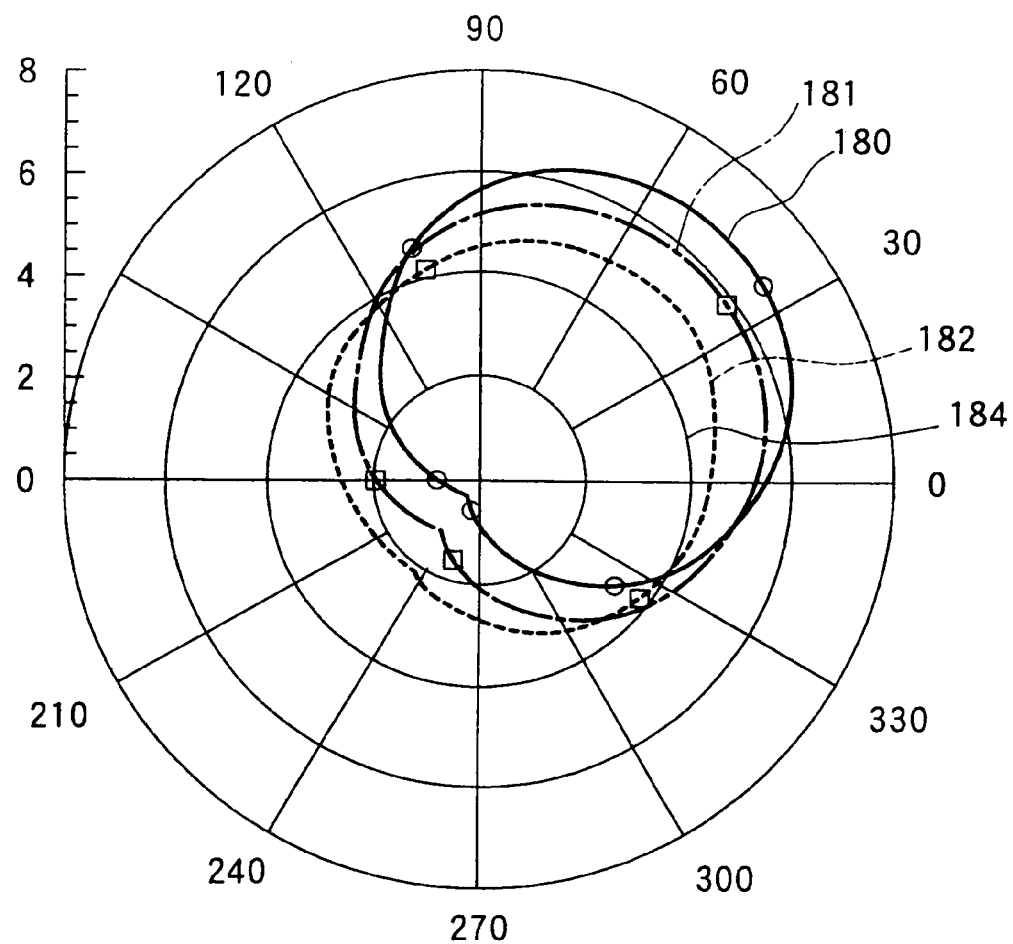
FIG. 13 is a schematic diagram illustrating the effect of the third preferred embodiment of the present invention.

Now referring to FIG. 13, there is shown the directivity characteristics obtained by the calculation process described above of the amount of offset $\theta_{off}$. In the figure, solid line 180 designates the directivity of offset $\theta_{off}$=60°, chained line 181 designates the directivity of offset $\theta_{off}$=80°, chained line 182 designates the directivity of offset $\theta_{off}$=100°, and solid line 184 designates the directivity of offset $\theta_{off}$=0°.

As can be appreciated from FIG. 13, directivity characteristics without null point is obtained by having three constrained orientations (45°−$\theta_{off}$, 45°, and 45°+$\theta_{off}$). The gain control may be achieved by adjusting the amount of offset.

Figure 14:
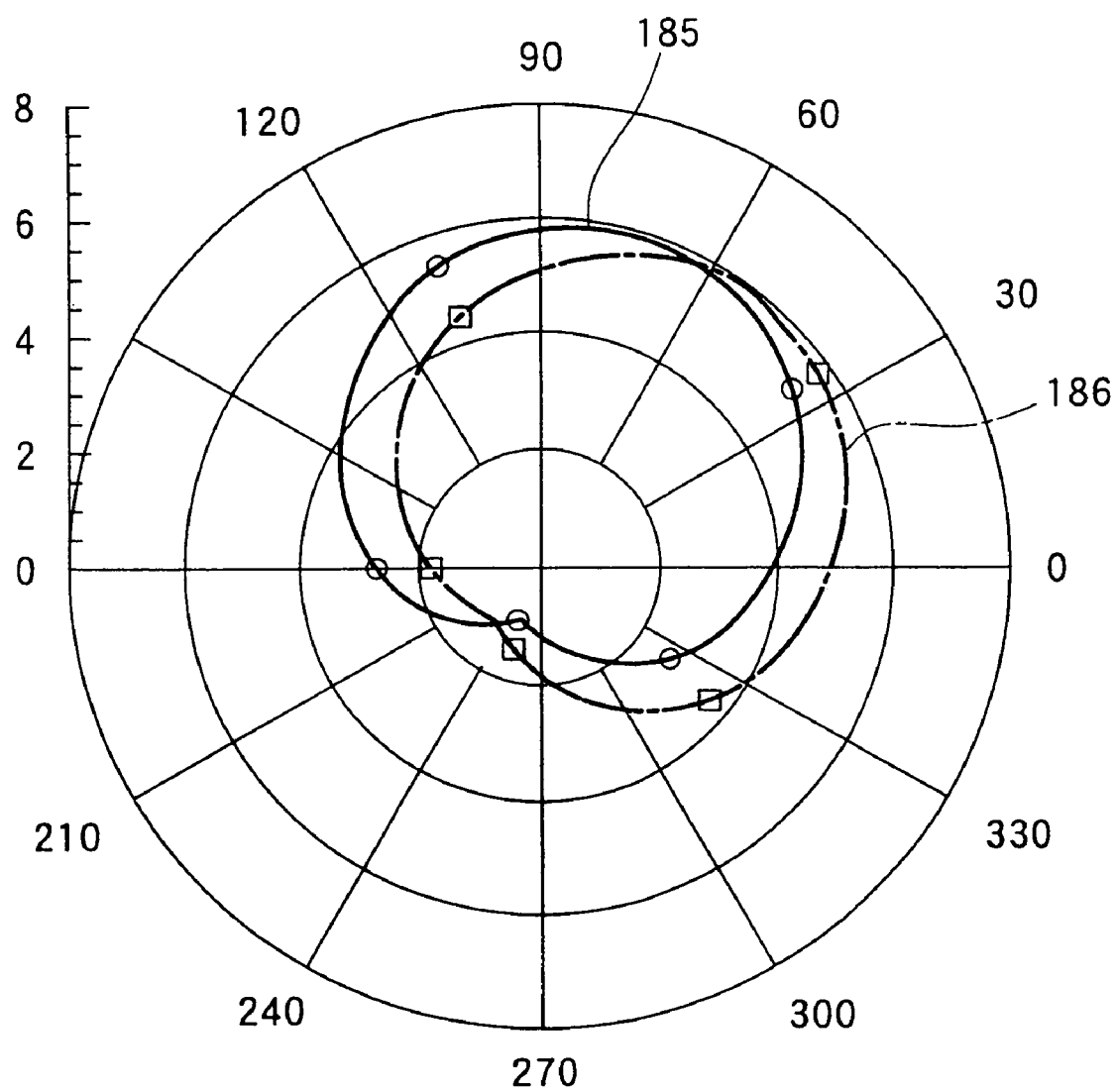
FIG. 14 is a schematic diagram illustrating the effect of the third preferred embodiment of the present invention.

Now referring to FIG. 14, there are shown the directive characteristics of the amount of offset $\theta_{off}$=80°, with the transmission beam directed to 45° and 75°. Solid line 185 designates the directivity when the transmission beam is directed to the angle 45°, chain line 186 designates the directivity when the transmission beam is directed to the angle 75°. As can be seen from FIG. 14, it can be noted that the directivity of the same shape may be realized at a different orientation if the amount of offset $\theta_{off}$ is the same.

By incorporating a processor for calculating the weight W into the receiver 160, a finer directivity control than the second preferred embodiment described above may be performed.

It is to be noted that although the base station sends the received power information Eb and the received power information Db as control signals in addition to the sector information indicative of sector E' and sector D', while the terminal station E calculates the amount of offset $\theta_{off}$ in response to received power information Eb and Db, the third embodiment may be modified as described below.

As described in the second preferred embodiment, if there are two terminal stations located at the points of symmetry about the center of base station, these two terminal stations are very likely to be mutually hidden terminal stations each other. If the controller unit 90 of the base station shown in FIG. 1 determines that there are hidden terminal stations (step 210), the sector information indicative of the sector E' in which one of those hidden terminal stations, the terminal station E (or the terminal station D) is located and the received power information Eb from the terminal station E are to be sent to the terminal station E as the control signals (step 220).

The terminal station E, in response to the received power information Eb included in the control signals, will calculate the distance between the terminal station E and the base station, the gain between the terminal station E and the base station (gain of transmission beam), the amount of offset θ off, and then the weight W, in a manner substantially similar to the previous example. The transmission beam from the terminal station E is thereby directed to the base station as well as to the terminal station D, while at the same time the null point in the transmission beam is eliminated.

Fourth Embodiment

In the second preferred embodiment, the terminal station E is assumed to be fixedly located. When the terminal station E is moving, the directivity control is performed by detecting the displacement by means of a geomagnetic sensor (azimuthal sensor) 190.

FIG. 15, shows a model with a built-in geomagnetic sensor 190 incorporated inside the array antenna shown in FIG. 7, and FIG. 16 shows the maximum radiation orientation when applying respective weight (W1–W8) to the phase controller. In the third embodiment, the directivity formed is identical to that shown in the second preferred embodiment. The directivity control of a terminal station by using the geomagnetic sensor 190 will be described below.

At first the terminal station E receives the angular information from the base station Z indicating that "receiving in the sector at the orientation 120° by north".

(1) The terminal station E calculates the orientation opposing to the base station (calculating 120°+180°=300°) at the terminal station E.

(2) By adding the amount of compensation 50° by the geomagnetic sensor 190 to the maximum radiation orientation of each weight, the compensated maximum radiation orientation S of each weight will be given by the following equation (22):

[1 2 W3 W4 W5 W6 W7 W8]+50°=[0 45 90 135 180 225 270 315]+50°=[50 95 140 185 235 275 320 5]   (eq. 22)

Then by comparing the calculated orientation by (1), 300° with the equation (22) in (2) above, the weight of the nearest value will be selected. In this case W7 will be selected.

In response to thus selected weight W7, the directivity control may be performed in a manner similar to the third preferred embodiment described above. Hidden terminal stations may be eliminated even if the terminal station E is moved, regardless of such movement.

In the second and fourth preferred embodiments, the terminal station E and the terminal station D are assumed to be located at the points of symmetry about the central base station, and the sector information (angular information) indicative of sector E' is sent to the terminal station E. However, the sector information (angular information) indicative of sector E' and sector D' may be sent to the terminal station E (or terminal station D).

The receiver 140 of the terminal station E obtains the orientation of sector D' based on the sector E' in a manner similar to the previous example, so as to move the orientation of directivity of the array antenna 110 to that of sector D' by using the variable phase generators 120*a*–120*h*. The receiver 140 of the terminal station D may obtain the orientation of sector E' based on the sector D' in a manner similar to the previous example, so as to move the orientation of directivity of the array antenna 110 to that of sector E' by using the variable phase generators 120*a*–120*h*.

In the second and fourth preferred embodiments, the amount of phase change is used for the weight in the transmission signals output to each of antenna elements of the array antenna 110 in order to form the directivity (transmission beam). Instead, the amount of amplitude change may be used for the weight in the transmission signals output to each of antenna elements of the array antenna 110. In such a case variable amplitude generators should be used in place of the variable phase generators.

The present invention may be embodied in other specific forms without departing from the spirit or essential characteristics thereof. For instance, the geomagnetic sensor 190 described in the fourth preferred embodiment may be applied to the terminal station in the first through third preferred embodiments.

What is claimed is:

1. A CSMA wireless LAN comprising:
   a base station;
   a plurality of terminal stations;
   antenna means provided in the base station for receiving signals from the plurality of terminal stations;
   terminal station identifier means provided in the base station for determining whether there are at least two transmitting terminal stations of the plurality of terminal stations in response to signal receptions by the antenna means, at least one of the transmitting terminal stations being a hidden terminal station;
   power notifying means provided in the base station for notifying the at least one of the transmitting terminal stations to increase a transmitting power when it is determined by the terminal station identifier means that there are at least two transmitting terminal stations
   the antenna means having a plurality of antenna elements;
   monitor means provided in the base station for monitoring a received power of each antenna element;
   wherein the terminal station identifier means determines whether there are at least two transmitting terminal stations based on comparisons of the received power of each antenna element monitored by the monitor means with a reference power.

2. A CSMA wireless LAN according to claim 1 wherein:
   at least one terminal station including includes transmitting power means capable of increasing the transmitting power when notified to increase power from the power notifying means.

3. A CSMA wireless LAN comprising:
   a base station;
   a plurality of terminal stations;
   a plurality of antenna elements forming a communication area comprised of a plurality of sectors, the plurality of antenna elements being provided in the base station for receiving signals from the plurality of terminal stations;
   terminal station identifier means provided in the base station for determining whether there are at least two transmitting terminal stations of the plurality of terminal stations in response to signal receptions by the plurality of antenna elements, at least one of the transmitting terminal stations being a hidden terminal station; and
   sector notifying means provided in the base station for notifying the hidden terminal station of sector information about the location of the at least one another transmitting terminal station when it is determined by the terminal station identifier means that there are at least two transmitting terminal stations.

4. A CSMA wireless LAN according to claim 3, wherein:
   the sector notifying means notifies a number indicative of a sector of the location of terminal stations as the sector location of transmitting the transmitting terminal stations.

5. A CSMA wireless LAN according to claim 3, wherein:
   the sector notifying means notifies an angle between a maximum irradiation orientation of the sector of the location of the transmitting terminal stations and a reference method for the sector location of transmitting terminal stations.

6. A CSMA wireless LAN according to claim 3 further comprising:
   monitor means provided in the base station for monitoring a received power of each antenna element,
   wherein the terminal station identifier means determines whether there are at least two transmitting terminal stations corresponding to comparisons of the received power of the plurality of antenna elements monitored by the monitor means with a reference power.

7. A CSMA wireless LAN comprising:
   a base station;
   a plurality of terminal stations;
   a plurality of antenna elements forming a communication area comprised of a plurality of sectors, the plurality of antenna elements being provided in the base station for receiving signals from the plurality of terminal stations;
   monitor means provided in the base station for monitoring a received power of each antenna element;

terminal station identifier means provided in the base station for determining whether there are at least two transmitting terminal stations in response to a signal reception by each antenna element, at least one of the transmitting terminal stations being a hidden terminal station; and sector notifying means provided in the base station for notifying the hidden terminal station terminal stations of sector information about the location of the transmitting terminal stations and received power from the at least one other transmitting terminal station by the monitor means when it is determined by the terminal station identifier means that there are at least two transmitting terminal stations.

8. A CSMA wireless LAN comprising:

a base station;

a plurality of terminal stations;

a plurality of antenna elements forming a communication area comprised of a plurality of sectors, the plurality of antenna elements being provided in the base station for receiving signals from the plurality of terminal stations;

terminal station identifier means provided in the base station for determining there are other transmitting terminal stations at the time of transmission from one terminal station in response to receptions by the plurality of antenna elements, at least one of the transmitting terminal stations being a hidden terminal station;

sector notifying means provided in the base station for notifying the hidden terminal station of the sector location of the at least one other transmitting terminal station when it is determined by the terminal station identifier means that there are other transmitting terminal stations.

9. A CSMA wireless LAN according to claim 8 wherein:

at least one terminal station has sector information notified from the sector notifying means for calculating an orientation of the hidden terminal station in response to the notified sector information in order to set a directivity to the calculated direction of the hidden terminal station.

10. A CSMA wireless LAN comprising:

a base station;

a plurality of terminal stations;

a plurality of antenna elements forming a communication area comprised of a plurality of sectors, the plurality of antenna elements being provided in the base station for receiving signals from the plurality of terminal stations;

monitor means provided in the base station for monitoring a received power of each antenna element;

terminal station identifier means provided in the base station for determining there are other transmitting terminal stations at the time of transmission from one terminal station in response to the reception by the plurality of antenna elements at least one of the transmitting terminal stations being a hidden station;

notifying means provided in the base station for notifying the hidden station of the sector location of the other transmitting terminal stations and the received power from the other transmitting terminal stations by the monitor means when it is determined by the terminal station identifier means that there are other transmitting terminal stations.

11. A CSMA wireless LAN according to claim 10 wherein:

at least one terminal station has sector information notified from the sector notifying means for calculating an orientation of the base station having the sector notifying means in response to the notified sector information in order to set a directivity to the calculated direction of the base station.

12. A CSMA wireless LAN according to claim 10 further comprising:

at least one terminal station has sector information notified from the sector notifying means for calculating an orientation of the base station having the sector notifying means in response to the notified sector information, and the at least one terminal station further having a plurality of antenna elements for forming a transmission beam directed to the calculated direction, wherein the transmission beam radio wave is output omnidirectionally, and a gain of the transmission beam being calculated in response to the notified received power.

13. A CSMA wireless LAN comprising:

a base station;

a plurality of terminal stations;

a plurality of antenna elements forming a communication area comprised of a plurality of sectors, the plurality of antenna elements being provided in a base station for receiving signals from the plurality of terminal stations;

terminal station identifier means provided in the base station for determining whether there are at least two transmitting terminal stations in response to signal receptions by the plurality of antenna elements, at least one of the transmitting terminal stations being a hidden terminal station; and sector notifying means provided in the base station for notifying the hidden terminal station of sector information about the location of the at least one transmitting terminal station when it is determined by the terminal station identifier means that there are at least two transmitting terminal stations;

each terminal station has sector information notified from the sector notifying means for calculating an orientation of the hidden terminal station in response to the notified sector information in order to set a directivity to the calculated direction of the hidden terminal station.

14. A CSMA wireless LAN according to claim 13, wherein:

at least one terminal station has a plurality of antenna elements for forming a transmission beam directed toward the calculated direction of the hidden terminal station, each antenna element outputting a non-directional radio wave beam.

15. A CSMA wireless LAN comprising:

a base station;

a plurality of terminal stations;

a plurality of antenna elements forming a communication area comprised of a plurality of sectors, the plurality of antenna elements being provided in the base station for receiving signals from the Plurality of terminal stations;

terminal station identifier means provided in the base station for determining whether there are at least two transmitting terminal stations in response to signal receptions by the plurality of antenna elements, at least one of the transmitting terminal stations being a hidden terminal station; and sector notifying means provided in the base station for notifying the hidden terminal station of sector information about the location of the at least one transmitting terminal station when it is determined by the terminal station identifier means that there are at least two transmitting terminal stations;

each terminal station having the sector information notified from the sector notifying means for calculating an orientation of the hidden terminal station in response to the notified sector information, the terminal station further having a directional sensor for detecting the orientation for compensating for the calculated orientation in response to the orientation detected by the sensor in order to set the directivity to the compensated direction.

16. A CSMA wireless LAN comprising:
a plurality of antenna elements forming a communication area comprised of a plurality of sectors;
monitor means for monitoring a received power of each antenna element;
terminal station identifier means for determining whether there are at least two terminal stations in response to a signal reception by each antenna element; and
sector notifying means for notifying at least one of the transmitting terminal stations of sector information about the location of the terminal stations and received power from the at least one other transmitting terminal stations by the monitor means when it is determined by the terminal station identifier means that there are at least two terminal stations;
a terminal station having the sector information notified from the sector notifying means for calculating an orientation of a hidden terminal station in response to the notified sector information, and the terminal station further having a plurality of antenna elements for forming a transmission beam directed to the calculated direction,
wherein the transmission beam is a radio wave output omnidirectionally and a gain of the transmission beam is calculated in response to a notified received power.

17. A CSMA wireless LAN comprising:
a base station;
a Plurality of terminal stations;
antenna means provided in the base station for receiving signals from the plurality of terminal stations;
terminal station identifier means provided in the base station for determining, during a reception of signal transmission from a first transmitting terminal station, whether there is a second transmitting terminal station in response to receptions of the antenna means at least one of the transmitting terminal stations being a hidden terminal station; and
notifying means provided in the base station for notifying, when it is determined by the terminal station identifier means that there is the second transmitting terminal station, the at least one of the transmitting terminal stations of information about communication areas such that the communication area of the at least one of the transmitting terminal stations may cover the communication area of the other transmitting terminal station.

18. A CSMA wireless LAN according to claim 17 further comprising:
a terminal station for altering the communication area in response to the information.

19. A CSMA wireless LAN according to claim 17 further comprising:
a terminal station having information notified from the notifying means and having a directional sensor for altering the communication area in response to the direction detected by the sensor and the notified information.

* * * * *